US012602993B2

(12) United States Patent
Li et al.

(10) Patent No.: US 12,602,993 B2
(45) Date of Patent: Apr. 14, 2026

(54) METHOD AND APPARATUS FOR OBTAINING TRAFFIC INFORMATION, AND STORAGE MEDIUM

(71) Applicant: SHENZHEN YINWANG INTELLIGENT TECHNOLOGIES CO., LTD., Shenzhen (CN)

(72) Inventors: Tianze Li, Shanghai (CN); Yan Wang, Shanghai (CN); Junqiang Tian, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 18/602,628

(22) Filed: Mar. 12, 2024

(65) Prior Publication Data

US 2024/0221499 A1 Jul. 4, 2024

Related U.S. Application Data

(63) Continuation of application No. PCT/CN2022/116826, filed on Sep. 2, 2022.

(30) Foreign Application Priority Data

Sep. 14, 2021 (CN) .......................... 202111074434.2

(51) Int. Cl.
*G08G 1/00* (2006.01)
*G08G 1/01* (2006.01)
(Continued)

(52) U.S. Cl.
CPC ......... *G08G 1/0125* (2013.01); *G08G 1/0112* (2013.01); *G08G 1/167* (2013.01); *H04W 4/44* (2018.02)

(58) Field of Classification Search
CPC .... G08G 1/0125; G08G 1/0112; G08G 1/167; G08G 1/0116; G08G 1/0141;
(Continued)

(56) References Cited

U.S. PATENT DOCUMENTS

| | | | |
|---|---|---|---|
| 2021/0237735 A1* | 8/2021 | Ha .................. | B60W 30/18159 |
| 2022/0292965 A1* | 9/2022 | Liu .................. | G08G 1/096766 |

FOREIGN PATENT DOCUMENTS

| | | |
|---|---|---|
| CN | 105403227 A | 3/2016 |
| CN | 106327897 A | 1/2017 |

(Continued)

OTHER PUBLICATIONS

Group Standard T/CSAE 53-2017, "Cooperative intelligent transportation system; vehicular communication; application layer specification and data exchange standard," Sep. 18, 2017, total 98 pages.

*Primary Examiner* — Shardul D Patel
(74) *Attorney, Agent, or Firm* — Conley Rose, P.C.

(57) ABSTRACT

A method for obtaining traffic information may be applied to an on-board unit. The method may include: receiving vehicle-to-everything (V2X) information, where the V2X information indicates a first group of lane identifiers and traffic information corresponding to each lane identifier in the first group of lane identifiers, and the first group of lane identifiers includes a first lane identifier; obtaining map information, where the map information indicates that a second lane identifier on a map and the first lane identifier correspond to a same lane; determining that a vehicle is on the lane corresponding to the second lane identifier; determining, based on the map information, that the vehicle is on the lane corresponding to the first lane identifier; and extracting traffic information corresponding to the first lane identifier from the V2X information.

20 Claims, 19 Drawing Sheets

(51) Int. Cl.
    *G08G 1/16*         (2006.01)
    *H04W 4/44*        (2018.01)

(58) Field of Classification Search
    CPC ......... G08G 1/09675; G08G 1/096775; G08G
               1/096783; G08G 1/00; H04W 4/44; G01C
                             21/32; G01C 21/3691
    USPC ........................................................ 701/117
    See application file for complete search history.

(56)                References Cited

FOREIGN PATENT DOCUMENTS

| | | | |
|---|---|---|---|
| CN | 108335510 | A | 7/2018 |
| CN | 108694841 | A | 10/2018 |
| CN | 112068171 | A | 12/2020 |
| CN | 113203425 | A | 8/2021 |
| CN | 113256989 | A | 8/2021 |
| WO | 2021164018 | A1 | 8/2021 |

* cited by examiner

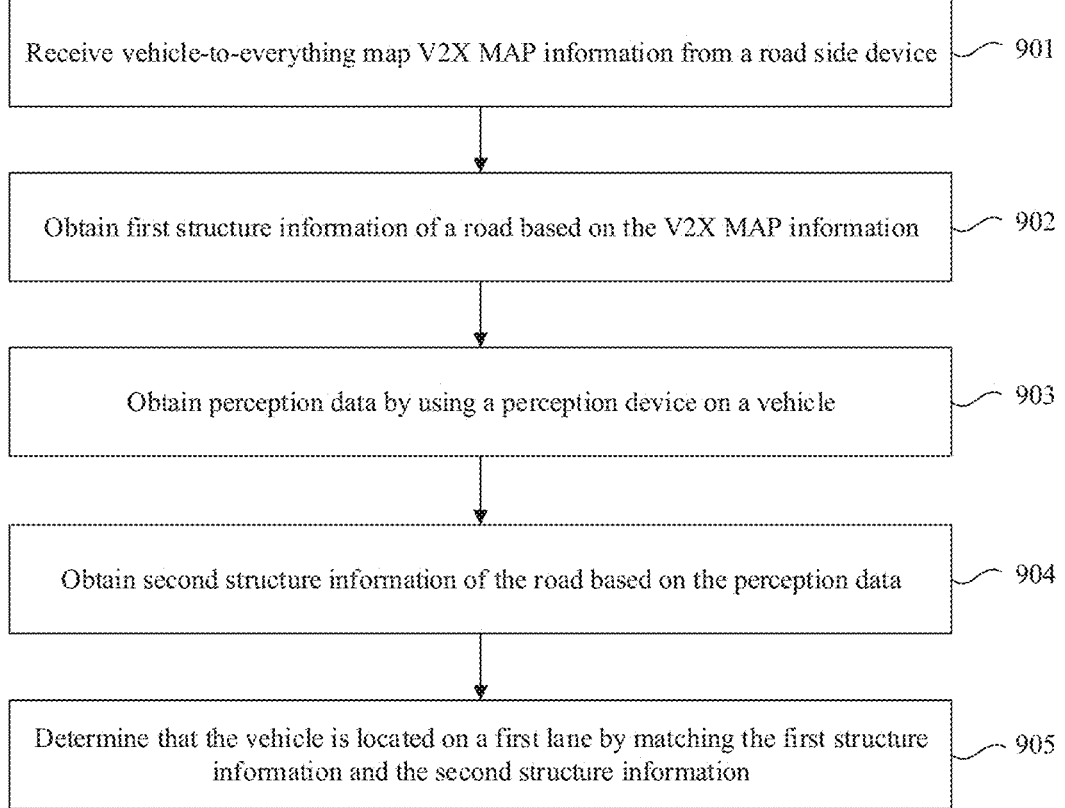

Receive vehicle-to-everything map V2X MAP information from a road side device — 901

Obtain first structure information of a road based on the V2X MAP information — 902

Obtain perception data by using a perception device on a vehicle — 903

Obtain second structure information of the road based on the perception data — 904

Determine that the vehicle is located on a first lane by matching the first structure information and the second structure information — 905

FIG. 9

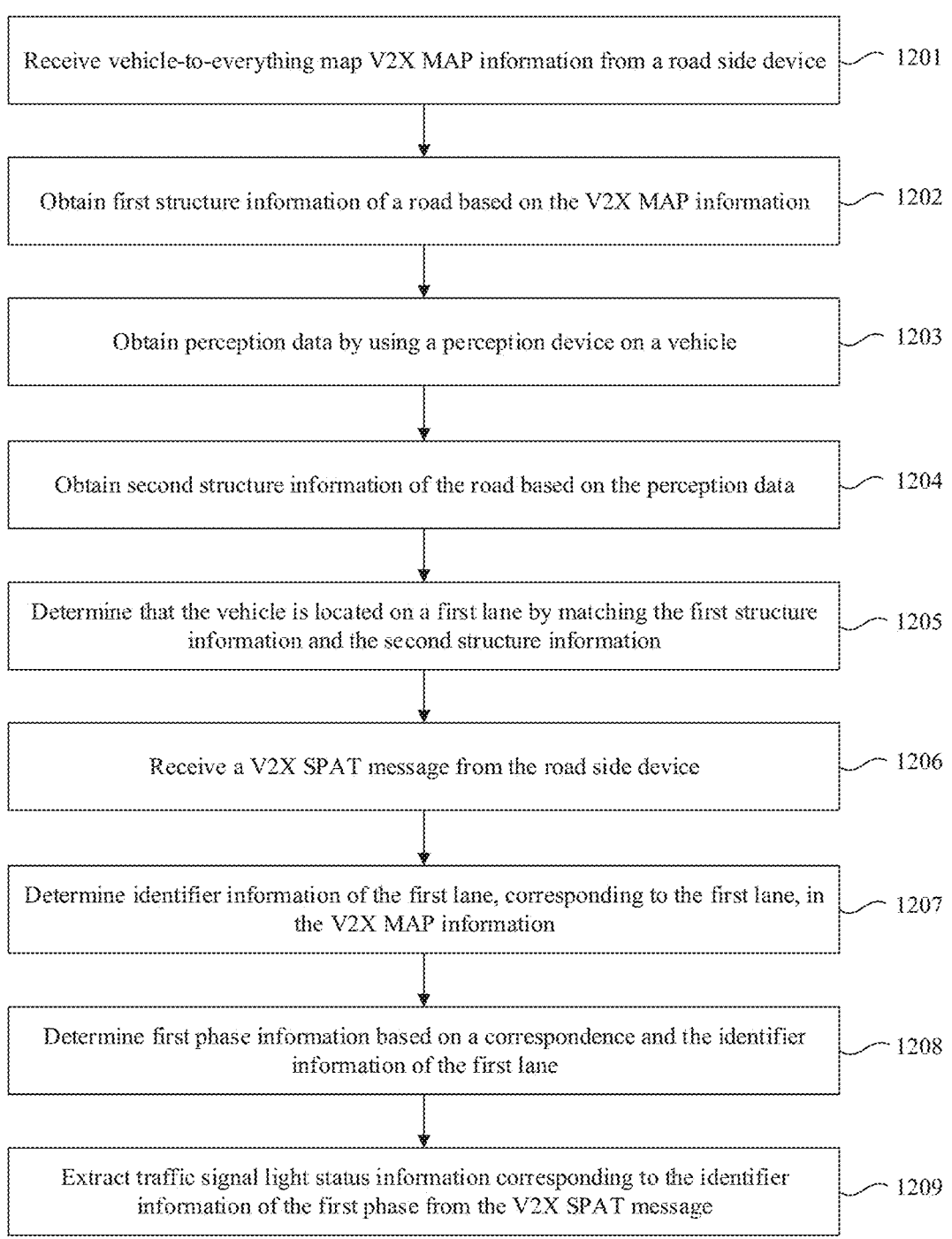

Receive vehicle-to-everything map V2X MAP information from a road side device — 1201

Obtain first structure information of a road based on the V2X MAP information — 1202

Obtain perception data by using a perception device on a vehicle — 1203

Obtain second structure information of the road based on the perception data — 1204

Determine that the vehicle is located on a first lane by matching the first structure information and the second structure information — 1205

Receive a V2X SPAT message from the road side device — 1206

Determine identifier information of the first lane, corresponding to the first lane, in the V2X MAP information — 1207

Determine first phase information based on a correspondence and the identifier information of the first lane — 1208

Extract traffic signal light status information corresponding to the identifier information of the first phase from the V2X SPAT message — 1209

FIG. 12

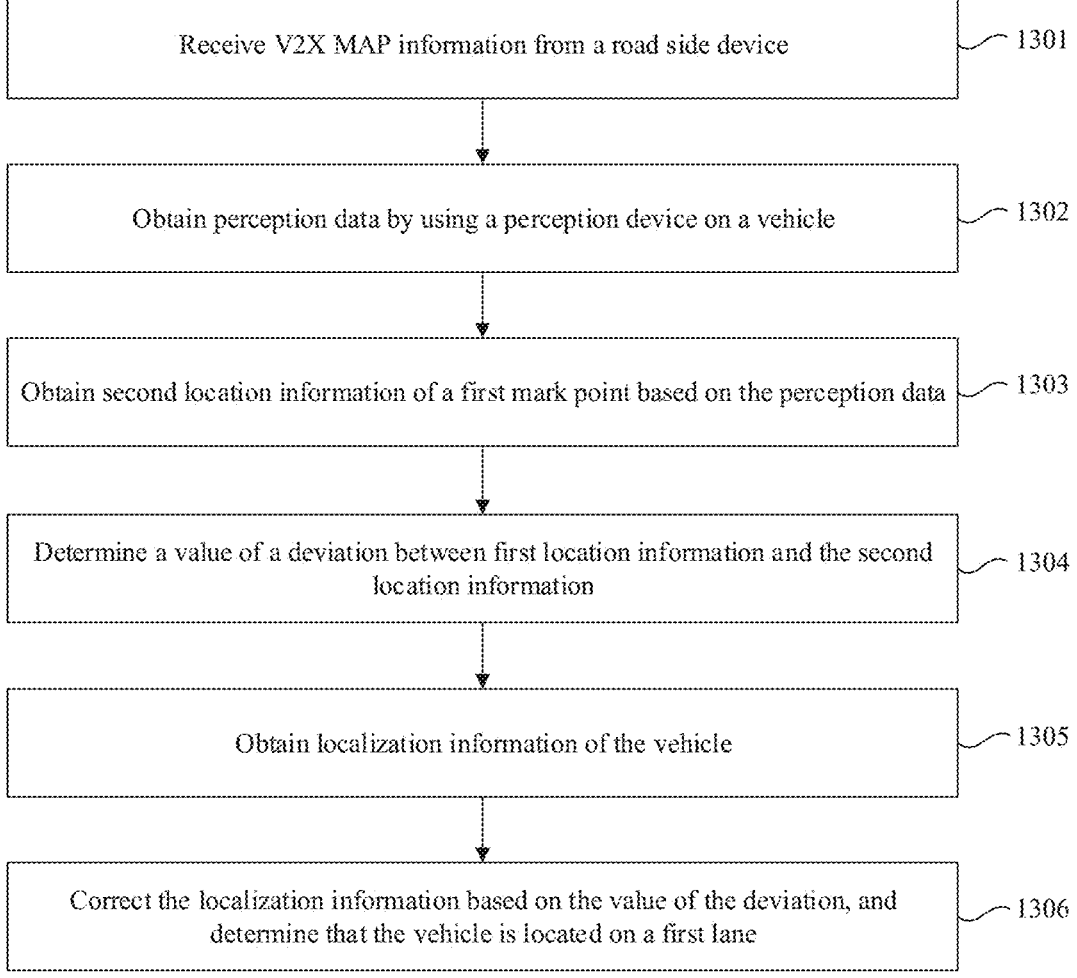

Receive V2X MAP information from a road side device ⟋ 1301

Obtain perception data by using a perception device on a vehicle ⟋ 1302

Obtain second location information of a first mark point based on the perception data ⟋ 1303

Determine a value of a deviation between first location information and the second location information ⟋ 1304

Obtain localization information of the vehicle ⟋ 1305

Correct the localization information based on the value of the deviation, and determine that the vehicle is located on a first lane ⟋ 1306

FIG. 13

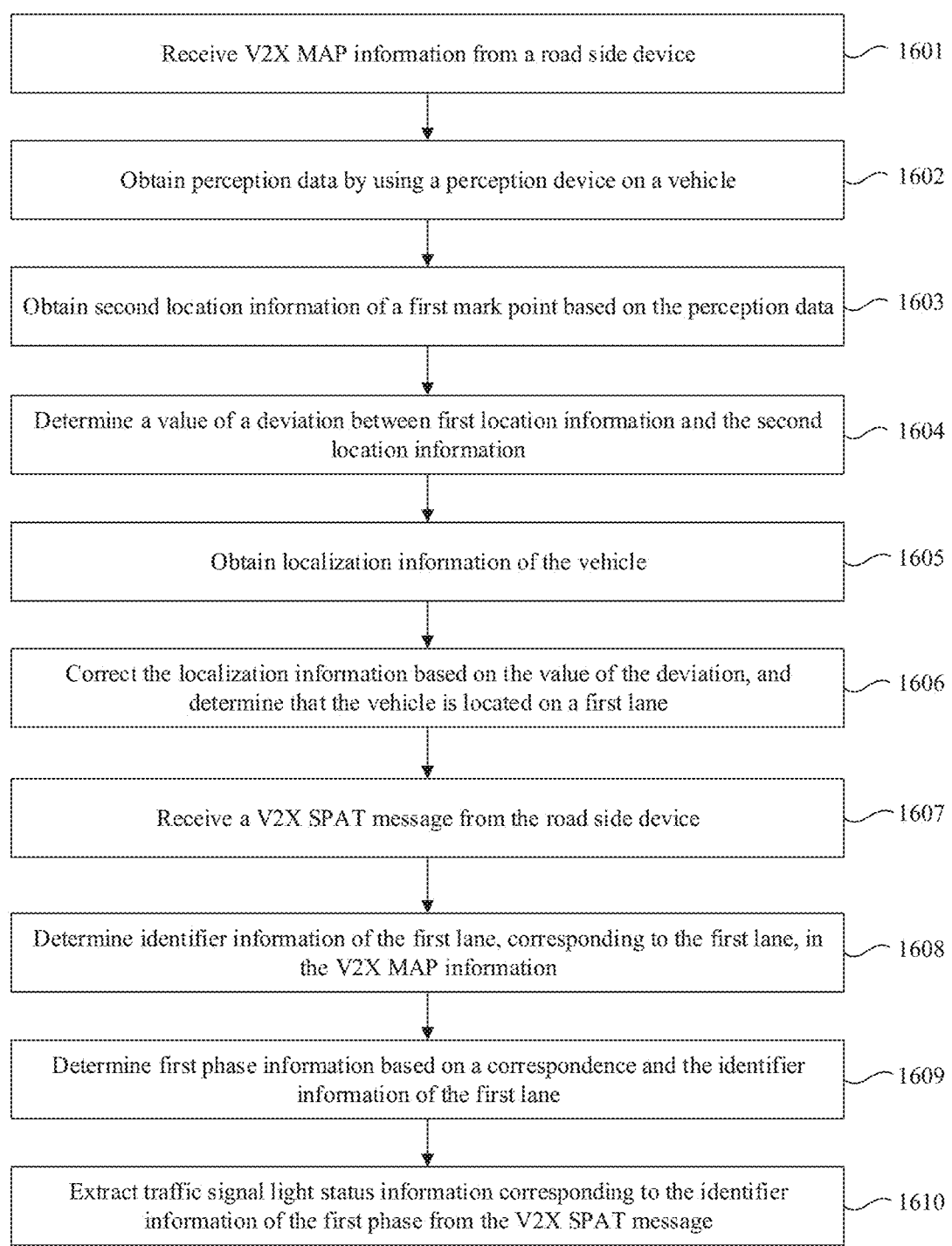

Receive V2X MAP information from a road side device — 1601

Obtain perception data by using a perception device on a vehicle — 1602

Obtain second location information of a first mark point based on the perception data — 1603

Determine a value of a deviation between first location information and the second location information — 1604

Obtain localization information of the vehicle — 1605

Correct the localization information based on the value of the deviation, and determine that the vehicle is located on a first lane — 1606

Receive a V2X SPAT message from the road side device — 1607

Determine identifier information of the first lane, corresponding to the first lane, in the V2X MAP information — 1608

Determine first phase information based on a correspondence and the identifier information of the first lane — 1609

Extract traffic signal light status information corresponding to the identifier information of the first phase from the V2X SPAT message — 1610

FIG. 16

METHOD AND APPARATUS FOR OBTAINING TRAFFIC INFORMATION, AND STORAGE MEDIUM

CROSS-REFERENCE TO RELATED APPLICATIONS

This is a continuation of International Patent Application No. PCT/CN2022/116826 filed on Sep. 2, 2022, which claims priority to Chinese Patent Application No. 202111074434.2 filed on Sep. 14, 2021. The disclosures of the aforementioned applications are hereby incorporated by reference in their entireties.

TECHNICAL FIELD

The present disclosure relates to the field of vehicle-to-everything, furthermore, to a method and apparatus for obtaining traffic information, and a storage medium.

BACKGROUND

At present, vehicle is the most used transportation way for people, and provide great convenience for life. As there are more vehicles on the road, traffic congestion, traffic accidents, and the like often occur at a junction. Based on a communications technology of vehicle-to-everything (V2X), a road side device disposed at a junction may broadcast V2X information to a vehicle, and the vehicle may obtain traffic information, for example, a corresponding road condition and a traffic signal light, based on the V2X information and a vehicle location, to adjust a driving action of the vehicle, so that a traffic safety risk is reduced to some extent, and traffic efficiency is improved.

In some approaches, a vehicle matches latitude and longitude information of each lane in received V2X information with latitude and longitude information of the localized vehicle, to determine a lane on which the vehicle is located, so that traffic information corresponding to the lane is obtained by parsing the V2X information. However, due to an influence of various factors, such as an obstacle of a building or a tree, localization signal interference, a tunnel area, or a multipath effect, the latitude and longitude information of the localized vehicle is inaccurate. As a result, the lane on which the vehicle is located cannot be accurately determined, and accurate traffic information may not be obtained.

SUMMARY

In view of this, a method and apparatus for obtaining traffic information, and a storage medium are provided.

According to a first aspect, an embodiment of the present disclosure provides a method for obtaining traffic information. The method may be performed by an on-board unit. The method may include: receiving V2X information, where the V2X information indicates a first group of lane identifiers and traffic information corresponding to each lane identifier in the first group of lane identifiers, and the first group of lane identifiers includes a first lane identifier; obtaining map information, where the map information indicates that a second lane identifier on a map and the first lane identifier correspond to a same lane; determining that a vehicle is on the lane corresponding to the second lane identifier; determining, based on the map information, that the vehicle is on the lane corresponding to the first lane identifier; and extracting traffic information corresponding to the first lane identifier from the V2X information. For example, the traffic information may include one or more of traffic signal light status information, traffic management information (for example, a type of a vehicle allowed to pass, a road name, a transit time, and speed limit information), road condition information, and allowed turning information (for example, about turning left, turning right, going straight, or making a U-turn), lane location information (for example, latitude and longitude information of a lane center line, latitude and longitude information of a lane edge line, or latitude and longitude information of a lane stop line), a lane width, a lane attribute (for example, lane sharing information, a curvature, a heading, or an incline of a lane), a link width, a lane connection relationship, and the like.

Based on the foregoing technical solution, the map information indicates that the second lane identifier on the map and the first lane identifier in the V2X information correspond to the same lane. After it is determined that the vehicle is on the lane corresponding to the second lane identifier, it may be determined, based on the map information, that the vehicle is on the lane corresponding to the first lane identifier, to ensure to accurately and quickly locate the lane on which the vehicle is located. In this way, the traffic information corresponding to the first lane identifier may be extracted from the received V2X information, thereby ensuring accuracy of the obtained traffic information. In addition, in the method, the map information is used, so that there is no dependence on precision of localization coordinate information (for example, latitude and longitude information in GNSS signal-based localization). Not only accuracy of the obtained traffic information is ensured, applicability of the method is also improved.

According to the first aspect, in a first possible implementation of the first aspect, the V2X information includes V2X map (MAP) information. The V2X MAP information includes a lane identifier laneID field, and the laneID field indicates the first group of lane identifiers.

Based on the foregoing technical solution, the map information indicates that the second lane identifier on the map and the lane ID in the V2X MAP information correspond to a same lane. After it is determined that the vehicle is on the lane corresponding to the second lane identifier, it may be determined, based on the map information, that the vehicle is on the lane corresponding to the lane ID, to accurately and quickly locate a lane corresponding to the vehicle in the V2X MAP information, so that traffic information corresponding to the lane ID can be further extracted.

According to the first aspect, in a second possible implementation of the first aspect, the V2X information includes a V2X signal phase and timing (SPAT) message. The V2X SPAT message includes a phase identifier PhaseID field, and the PhaseID field indicates the first group of lane identifiers.

Based on the foregoing technical solution, the map information indicates that the second lane identifier on the map and the phase ID in the V2X SPAT message correspond to a same lane. After it is determined that the vehicle is on the lane corresponding to the second lane identifier, it may be determined, based on the map information, that the vehicle is on the lane corresponding to the phase ID, to accurately and quickly locate a lane corresponding to the vehicle in the V2X SPAT message, so that traffic information, for example, traffic signal light status information, corresponding to the phase ID can be further extracted, thereby ensuring accuracy of the obtained traffic signal light status information.

According to the first possible implementation of the first aspect, in a third possible implementation of the first aspect, the V2X MAP information further includes one or more of a laneWidth field, a laneAttributes field, a maneuvers field, a connectsTo field, a points field, a speedLimits field, and a linkWidth field. The laneWidth field indicates a width of the lane corresponding to the lane ID, the laneAttributes field indicates an attribute of the lane corresponding to the lane ID, the maneuvers field indicates an allowed turning behavior, corresponding to the lane ID, at a lane exit, the speedLimits field indicates speed limit information of the lane corresponding to the lane ID or speed limit information of a link including the lane corresponding to the lane ID; the link Width field indicates a width of the link including the lane corresponding to the lane ID; the points field indicates a set of feature points of the lane corresponding to the lane ID, where the feature points include feature points on a lane center line, a lane edge line, or a lane stop line, and the set of feature points includes location information of each feature point (that is, location information of the lane); and the connectsTo field indicates a set of connection relationships between the lane corresponding to the lane ID and a lane in a downstream link.

According to the second possible implementation of the first aspect, in a fourth possible implementation of the first aspect, the V2X SPAT message further includes a phaseStates field. The phaseStates field indicates the traffic signal light status information corresponding to the phase ID.

According to a second aspect, an embodiment of the present disclosure provides a localization method. The method may be performed by an on-board unit. The method may include: receiving V2X MAP information from a road side device; obtaining first structure information of a road based on the V2X MAP information; obtaining perception data by using a perception device on a vehicle; obtaining second structure information of the road based on the perception data; and determining, by matching the first structure information with the second structure information, that the vehicle is on a first lane.

Based on the foregoing technical solution, the first structure information of the road is obtained based on the V2X MAP information; the second structure information of the road is obtained based on the perception data; and it is determined, by matching the first structure information with the second structure information, that the vehicle is on the first lane. In this manner, there is no dependence on precision of localization coordinate information (for example, latitude and longitude information in GNSS signal-based localization), and accuracy of lane localization and applicability of the method are improved.

According to the second aspect, in a first possible implementation of the second aspect, the V2X MAP information includes the first structure information and identifier information, of the first lane, corresponding to the first structure information; and the determining, by matching the first structure information with the second structure information, that the vehicle is on a first lane includes: determining, based on a matching result, that the first structure information and the second structure information belong to a same lane; obtaining the identifier information of the first lane based on the first structure information; and determining the first lane based on the identifier information of the first lane.

According to the second aspect, in a second possible implementation of the second aspect, the V2X MAP information indicates a correspondence between identifier information of a plurality of lanes and identifier information of a plurality of phases, the plurality of lanes include the first lane, the identifier information of the plurality of lanes includes the identifier information of the first lane, and the identifier information of the plurality of phases includes identifier information of a first phase; and the method further includes: receiving a V2X SPAT message from the road side device, where the V2X SPAT message includes the identifier information of the first phase and traffic signal light status information corresponding to the identifier information of the first phase; determining the identifier information of the first lane, corresponding to the first lane, in the V2X MAP information; determining the identifier information of the first phase based on the correspondence and the identifier information of the first lane; and extracting the traffic signal light status information corresponding to the identifier information of the first phase from the V2X SPAT message.

Based on the foregoing technical solution, the first structure information of the road is obtained based on the V2X MAP information; the second structure information of the road is obtained based on the perception data; and it is determined, by matching the first structure information with the second structure information, that the vehicle is on the first lane. In this way, the identifier information, of the first lane, corresponding to the first lane is further determined, and the traffic signal light status information corresponding to the identifier information of the first phase is extracted based on the V2X SPAT message. In this manner, there is no dependence on precision of localization coordinate information, and accuracy of lane localization and applicability of the method are improved, thereby ensuring that accurate traffic signal light status information is obtained, and improving vehicle driving safety.

According to any one of the second aspect or the foregoing possible implementations of the second aspect, in a third possible implementation of the second aspect, the structure information indicates one or more of a lane attribute, a lane location, and a lane width.

According to any one of the second aspect or the foregoing possible implementations of the second aspect, in a fourth possible implementation of the second aspect, the V2X MAP information includes a lanes field, and the lanes field indicates the first structure information.

According to any one of the second aspect or the foregoing possible implementations of the second aspect, in the fourth possible implementation of the second aspect, the obtaining second structure information of the road based on the perception data includes: obtaining the second structure information of the road based on the perception data and a map.

Based on the foregoing technical solution, the map includes a rich source of road information, and precision of the second structure information is higher when the second structure information of the road is obtained based on the perception data and the map.

According to a third aspect, an embodiment of the present disclosure provides a localization method. The method may be performed by an on-board unit, and the method includes: receiving V2X MAP information from a road side device, where the V2X MAP information indicates location information of a plurality of mark points on a road, the plurality of mark points include a first mark point, and the location information of the plurality of mark points includes first location information of the first mark point; obtaining perception data by using a perception device on a vehicle; obtaining second location information of the first mark point based on the perception data; determining a value of a deviation between the first location information and the second location information; obtaining localization information of the vehicle; and correcting the localization information based on the value of the deviation, and determining that the vehicle is on a first lane.

Based on the foregoing technical solution, the second location information of the first mark point is obtained based on the perception data; the value of the deviation, indicated by the V2X MAP information, between the first location information and the second location information that are of the first mark point is determined; and the localization information of the vehicle is corrected based on the value of the deviation, to determine that the vehicle is on the first lane. In this manner, there is no dependence on precision of vehicle localization information (for example, latitude and longitude information in GNSS signal-based localization), and accuracy of lane localization and applicability of the method are improved.

According to the third aspect, in a second possible implementation of the third aspect, the V2X MAP information indicates a correspondence between identifier information of a plurality of lanes and identifier information of a plurality of phases, the plurality of lanes include the first lane, the identifier information of the plurality of lanes includes identifier information of the first lane, and the identifier information of the plurality of phases includes identifier information of a first phase; and the method further includes: receiving a V2X SPAT message from the road side device, where the V2X SPAT message includes the identifier information of the first phase and traffic signal light status information corresponding to the identifier information of the first phase; determining the identifier information of the first lane, corresponding to the first lane, in the V2X MAP information; determining the identifier information of the first phase based on the correspondence and the identifier information of the first lane; and extracting the traffic signal light status information corresponding to the identifier information of the first phase from the V2X SPAT message.

Based on the foregoing technical solution, the second location information of the first mark point is obtained based on the perception data; the value of the deviation, indicated by the V2X MAP information, between the first location information and the second location information that are of the first mark point is determined; and the localization information of the vehicle is corrected based on the value of the deviation, to determine that the vehicle is on the first lane, so that the identifier information, of the first lane, corresponding to the first lane is further determined, and the traffic signal light status information corresponding to the identifier information of the first phase is extracted based on the V2X SPAT message. In this manner, there is no dependence on precision of vehicle localization information, and accuracy of lane localization and applicability of the method are improved, thereby ensuring to obtain accurate traffic signal light status information, and improving driving safety.

According to the third aspect or the first possible implementation of the third aspect, in a second possible implementation of the third aspect, a distance between the first mark point and the vehicle is within a preset range.

Based on the foregoing technical solution, localization deviation values corresponding to points in a specific area may be considered the same. The localization information of the vehicle is corrected based on a value of a deviation corresponding to the first mark point, so that a lane on which the vehicle is located is more accurately determined, thereby improving accuracy of lane localization.

According to any one of the third aspect or the foregoing possible implementations of the third aspect, in a third possible implementation of the third aspect, a quantity of mark points included in the plurality of mark points depends on a length and/or curvature of the road.

In some examples, when the road is a straight road or the road is relatively short, a small quantity of feature points may be selected as the plurality of mark points, thereby improving data processing efficiency; or when the road is a bend or the road is relatively long, a small quantity of feature points may be selected as the plurality of mark points, to fully reflect a feature of a road environment, thereby ensuring to obtain a valid value of a deviation in a plurality of road environments.

According to any one of the third aspect or the foregoing possible implementations of the third aspect, in a fourth possible implementation of the third aspect, the obtaining second location information of the first mark point based on the perception data includes: determining the second location information based on the perception data and map data.

Based on the foregoing technical solution, precision of the second location information obtained based on the perception data and the map data is higher.

According to a fourth aspect, an embodiment of the present disclosure provides an apparatus for obtaining traffic information. The apparatus may include: a receiving module configured to receive V2X information, where the V2X information indicates a first group of lane identifiers and traffic information corresponding to each lane identifier in the first group of lane identifiers, and the first group of lane identifiers includes a first lane identifier; a map information obtaining module configured to obtain map information, where the map information indicates that a second lane identifier on a map and the first lane identifier correspond to a same lane; a first localization module configured to determine that a vehicle is on the lane corresponding to the second lane identifier; a second localization module configured to determine, based on the map information, that the vehicle is on the lane corresponding to the first lane identifier; and a traffic information obtaining module configured to extract traffic information corresponding to the first lane identifier from the V2X information.

According to the fourth aspect, in a first possible implementation of the fourth aspect, the V2X information includes V2X MAP information, the V2X MAP information includes a lane identifier laneID field, and the laneID field indicates the first group of lane identifiers.

According to the fourth aspect, in a second possible implementation of the fourth aspect, the V2X information includes a V2X SPAT message, the V2X SPAT message includes a phase identifier PhaseID field, and the PhaseID field indicates the first group of lane identifiers.

According to the first possible implementation of the fourth aspect, in a third possible implementation of the fourth aspect, the V2X MAP information further includes one or more of a laneWidth field, a laneAttributes field, a maneuvers field, a connectsTo field, a points field, a speedLimits field, and a link Width field.

According to the second possible implementation of the fourth aspect, in a fourth possible implementation of the fourth aspect, the V2X SPAT message further includes a phaseStates field.

According to a fifth aspect, an embodiment of the present disclosure provides a localization apparatus. The apparatus includes: a receiving module configured to receive V2X MAP information from a road side device; a first structure information obtaining module configured to obtain first structure information of a road based on the V2X MAP information; a perception data obtaining module configured to obtain perception data by using a perception device on a vehicle; a second structure information obtaining module configured to obtain second structure information of the road based on the perception data; and a matching module configured to determine, by matching the first structure information with the second structure information, that the vehicle is on a first lane.

According to the fifth aspect, in a first possible implementation of the fifth aspect, the V2X MAP information includes the first structure information and identifier information, of the first lane, corresponding to the first structure information; and the matching module is further configured to: determine, based on a matching result, that the first structure information and the second structure information belong to a same lane; obtain the identifier information of the first lane based on the first structure information; and determine the first lane based on the identifier information of the first lane.

According to the fifth aspect, in a second possible implementation of the fifth aspect, the V2X MAP information indicates a correspondence between identifier information of a plurality of lanes and identifier information of a plurality of phases, the plurality of lanes include the first lane, the identifier information of the plurality of lanes includes identifier information of the first lane, and the identifier information of the plurality of phases includes identifier information of a first phase; and the apparatus further includes a traffic signal light status information obtaining module configured to: receive a V2X SPAT message from the road side device, where the V2X SPAT message includes the identifier information of the first phase and traffic signal light status information corresponding to the identifier information of the first phase; determine the identifier information of the first lane, corresponding to the first lane, in the V2X MAP information; determine the identifier information of the first phase based on the correspondence and the identifier information of the first lane; and extract the traffic signal light status information corresponding to the identifier information of the first phase from the V2X SPAT message.

According to any one of the fifth aspect or the foregoing possible implementations of the fifth aspect, in a third possible implementation of the fifth aspect, the structure information indicates one or more of a lane attribute, a lane location, and a lane width.

According to any one of the fifth aspect or the foregoing possible implementations of the fifth aspect, in a fourth possible implementation of the fifth aspect, the V2X MAP information includes a lanes field, and the lanes field indicates the first structure information.

According to any one of the fifth aspect or the foregoing possible implementations of the fifth aspect, in the fourth possible implementation of the fifth aspect, the second structure information obtaining module is further configured to obtain the second structure information of the road based on the perception data and a map.

According to a sixth aspect, an embodiment of the present disclosure provides a localization apparatus. The apparatus includes: a receiving module configured to receive V2X MAP information from a road side device, where the V2X MAP information indicates location information of a plurality of mark points on a road, the plurality of mark points include a first mark point, and the location information of the plurality of mark points includes first location information of the first mark point; a perception data obtaining module configured to obtain perception data by using a perception device on a vehicle; a second location information obtaining module configured to obtain second location information of the first mark point based on the perception data; a deviation value determining module configured to determine a value of a deviation between the first location information and the second location information; a localization information obtaining module configured to obtain localization information of the vehicle; and a correction module configured to: correct the localization information based on the value of the deviation, and determine that the vehicle is on a first lane.

According to the sixth aspect, in a second possible implementation of the sixth aspect, the V2X MAP information indicates a correspondence between identifier information of a plurality of lanes and identifier information of a plurality of phases, the plurality of lanes include the first lane, the identifier information of the plurality of lanes includes identifier information of the first lane, and the identifier information of the plurality of phases includes identifier information of a first phase; and the apparatus further includes a traffic signal light status information obtaining module configured to: receive a V2X SPAT message from the road side device, where the V2X SPAT message includes the identifier information of the first phase and traffic signal light status information corresponding to the identifier information of the first phase; determine the identifier information of the first lane, corresponding to the first lane, in the V2X MAP information; determine the identifier information of the first phase based on the correspondence and the identifier information of the first lane; and extract the traffic signal light status information corresponding to the identifier information of the first phase from the V2X SPAT message.

According to the sixth aspect or the first possible implementation of the sixth aspect, in the second possible implementation of the sixth aspect, a distance between the first mark point and the vehicle is within a preset range.

According to any one of the sixth aspect or the foregoing possible implementations of the sixth aspect, in a third possible implementation of the sixth aspect, a quantity of mark points included in the plurality of mark points depends on a length and/or curvature of the road.

According to any one of the sixth aspect or the foregoing possible implementations of the sixth aspect, in a fourth possible implementation of the sixth aspect, the perception data obtaining module is further configured to determine the second location information based on the perception data and map data.

According to a seventh aspect, an embodiment of the present disclosure provides a processing apparatus, including: a processor; and a memory configured to store instructions that can be executed by the processor. The processor is configured to implement the method for obtaining traffic information according to the first aspect or the possible implementations of the first aspect, the localization method according to the second aspect or the possible implementations of the second aspect, or the localization method according to the third aspect or the possible implementations of the third aspect when executing the instructions. For example, the processing apparatus may be a vehicle, or a component, a chip, a hardware module, a software module, or the like in the vehicle.

According to an eighth aspect, an embodiment of the present disclosure provides a non-volatile computer-readable storage medium, storing computer program instructions. When the computer program instructions are executed by a processor, the method for obtaining traffic information according to the first aspect or the possible implementations of the first aspect, the localization method according to the second aspect or the possible implementations of the second aspect, or the localization method according to the third aspect or the possible implementations of the third aspect is implemented.

According to a ninth aspect, an embodiment of the present disclosure provides a computer program product, including computer-readable code or a non-volatile computer-readable storage medium carrying computer-readable code. When the computer-readable code runs on a processor, the method for obtaining traffic information according to the first aspect or the possible implementations of the first aspect, the localization method according to the second aspect or the possible implementations of the second aspect is implemented, or the localization method according to the third aspect or the possible implementations of the third aspect is implemented.

According to a tenth aspect, an embodiment of the present disclosure provides a vehicle, including the apparatus according to the fourth aspect, the fifth aspect, the sixth aspect, the seventh aspect, or the possible implementations of the fourth aspect to the seventh aspect.

For technical effects of the foregoing aspects and the possible implementations, refer to the first aspect, the second aspect, or the third aspect.

BRIEF DESCRIPTION OF DRAWINGS

FIG. 9 is a flowchart of a localization method according to an embodiment of the present disclosure;

FIG. 12 is a flowchart of another method for obtaining traffic information according to an embodiment of the present disclosure;

FIG. 13 is a flowchart of another method for obtaining traffic information according to an embodiment of the present disclosure;

FIG. 16 is a flowchart of another method for obtaining traffic information according to an embodiment of the present disclosure;

DESCRIPTION OF EMBODIMENTS

Various example embodiments, features, and aspects of the present disclosure are described below in detail with reference to the accompanying drawings. Identical reference signs in the accompanying drawings indicate elements that have a same or similar function. Although various aspects of embodiments are shown in the accompanying drawings, unless otherwise specified, the accompanying drawings do not need to be drawn to scale.

The specific term "example" herein means "used as an example, embodiment, or illustration". Any embodiment described as an "example" is not necessarily explained as being more preferred or better than other embodiments.

In addition, to better describe the present disclosure, many specific details are given in the following description of embodiments. A person skilled in the art should understand that the present disclosure can still be implemented without some specific details. In some embodiments, methods, means, elements, and circuits that are well-known to a person skilled in the art are not described in detail, so that the subject matter of the present disclosure is highlighted.

For ease of understanding of embodiments of the present disclosure, some concepts used in embodiments of the present disclosure are first briefly described below.

1. V2I

V2I is a type of important application in V2X, and refers to a technology for an interconnection between an on-board unit (OBU) and a road side unit (RSU). The on-board unit may be deployed in a vehicle, and the road side unit may be deployed in a road side device on a road, for example, a traffic signal controller, a signage, or a server. V2I information exchanged between the on-board unit and the road side unit may include at least one of the following types: a basic safety message (BSM), map data or MAP, a road side safety message (RSM), a SPAT, and road side information (RSI).

For example, the road side unit is deployed in a traffic signal light at a junction. The road side unit may manage information related to each link at the junction at which the traffic signal light is located and information related to the traffic signal light, and broadcast the information in a form of MAP information and a SPAT message. The information may be received by an on-board unit near the junction.

2. MAP Information

Figure 1:
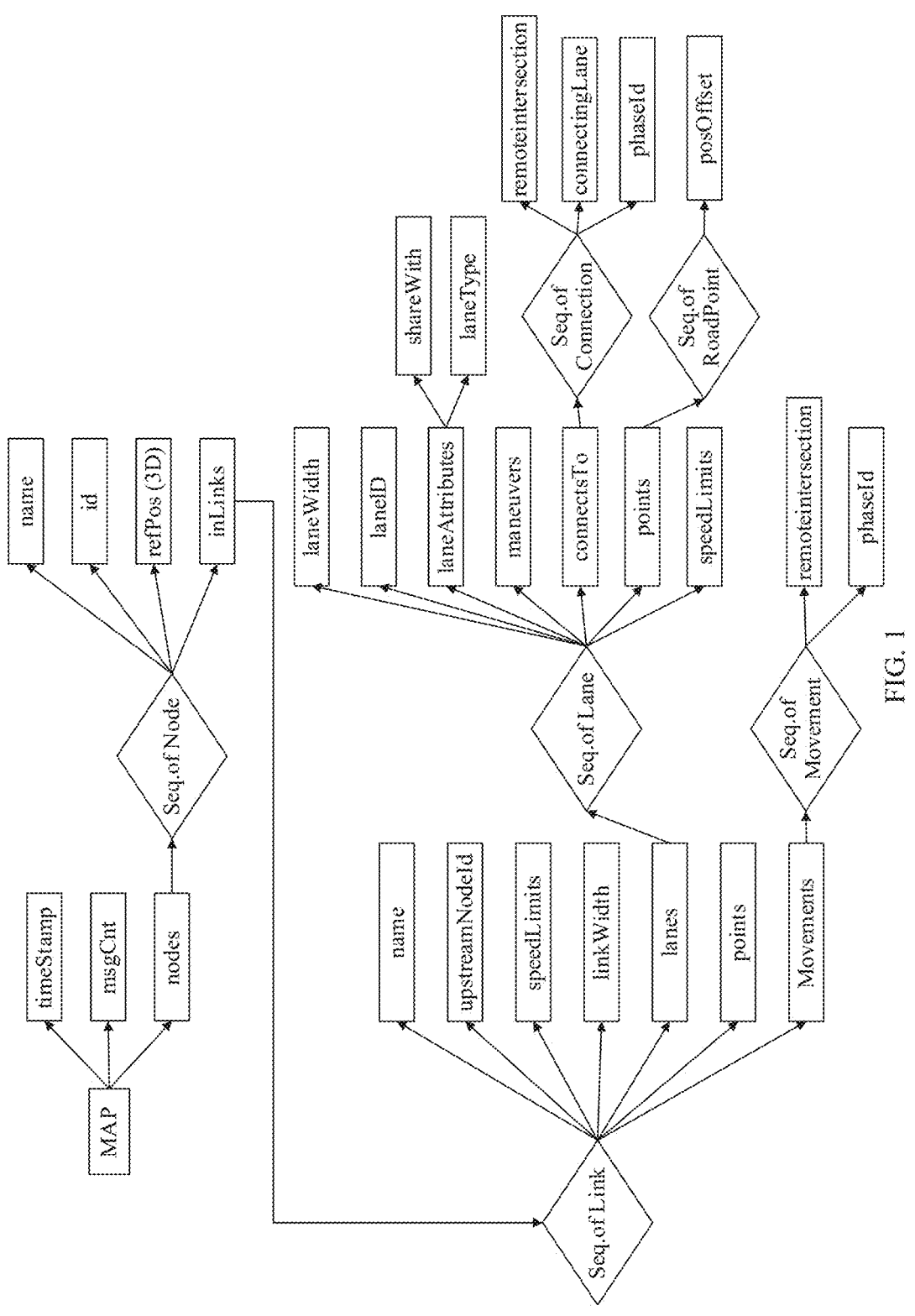
FIG. 1 is a schematic diagram of a structure of MAP information according to an embodiment of the present disclosure.

The MAP information is used to transmit a plurality of types of geographic road information. FIG. 1 is a schematic diagram of a structure of MAP information according to an embodiment of the present disclosure. As shown in FIG. 1, the structure of the MAP information is in a form with nested layers. For example, the MAP information may include one or more of the following fields:

An information serial number (msgCnt): A transmit end numbers transmitted MAP information, and a value of the number ranges from 0 to 127, where an initial value may be a random number, and then increases in ascending order. A time stamp (timeStamp): The transmit end reads a time stamp in a Global Positioning System (GPS), and adds the time stamp to the MAP information for transmission, to prevent a replay attack. A set of nodes: The MAP information can transmit a series of junction information in a local area, and each node is a junction node.

For any junction node in the set of nodes, an information sequence Seq.of Node may include a node name, a node identifier (ID), a node location (refPos(3D)) (x-axis: left and right space, y-axis: front and rear space, and z-axis: upper and lower space), and a set of links (inLinks) that uses the junction node as a downstream node.

For any link in the set of links, an information sequence Seq.of Link may include a link name, an upstream node ID, a link speed limit set (speedLimits), a link width (link Width), a set of lanes included in the link, link feature points, and a set of connection relationships (movements) between the link and a downstream link.

For any lane in the set of lanes included in the link, an information sequence Seq.of Lane may include a lane width (laneWidth), a lane ID (laneID), a lane attribute (laneAttributes) (including a lane sharing status (shareWith) and a type characteristic (laneType) of the lane), an allowed turning behavior (maneuvers) (for example, a left turn, a right turn, straight going, or a U-turn) at a lane exit, a set of connection relationships (connectsTo) between the lane and a lane in a downstream link (each of the connection relationships may include a corresponding remote intersection (remote intersection) in the downstream link, a corresponding lane (connectingLane) in the downstream link, and a traffic signal light phase ID (phaseID) at a corresponding local junction), a set of lane feature points (points) (an information sequence Seq.of RoadPoint of each of the feature points may include location information (posOffset)), and a lane speed limit (speedLimits).

For any connection relationship in the set of connection relationships between the link and the downstream link, an information sequence Seq.of Movement may include a corresponding remote intersection (remote intersection) of the downstream link and a signal light phase ID (phaseID) at a corresponding local junction.

3. SPAT Message

Figure 2:
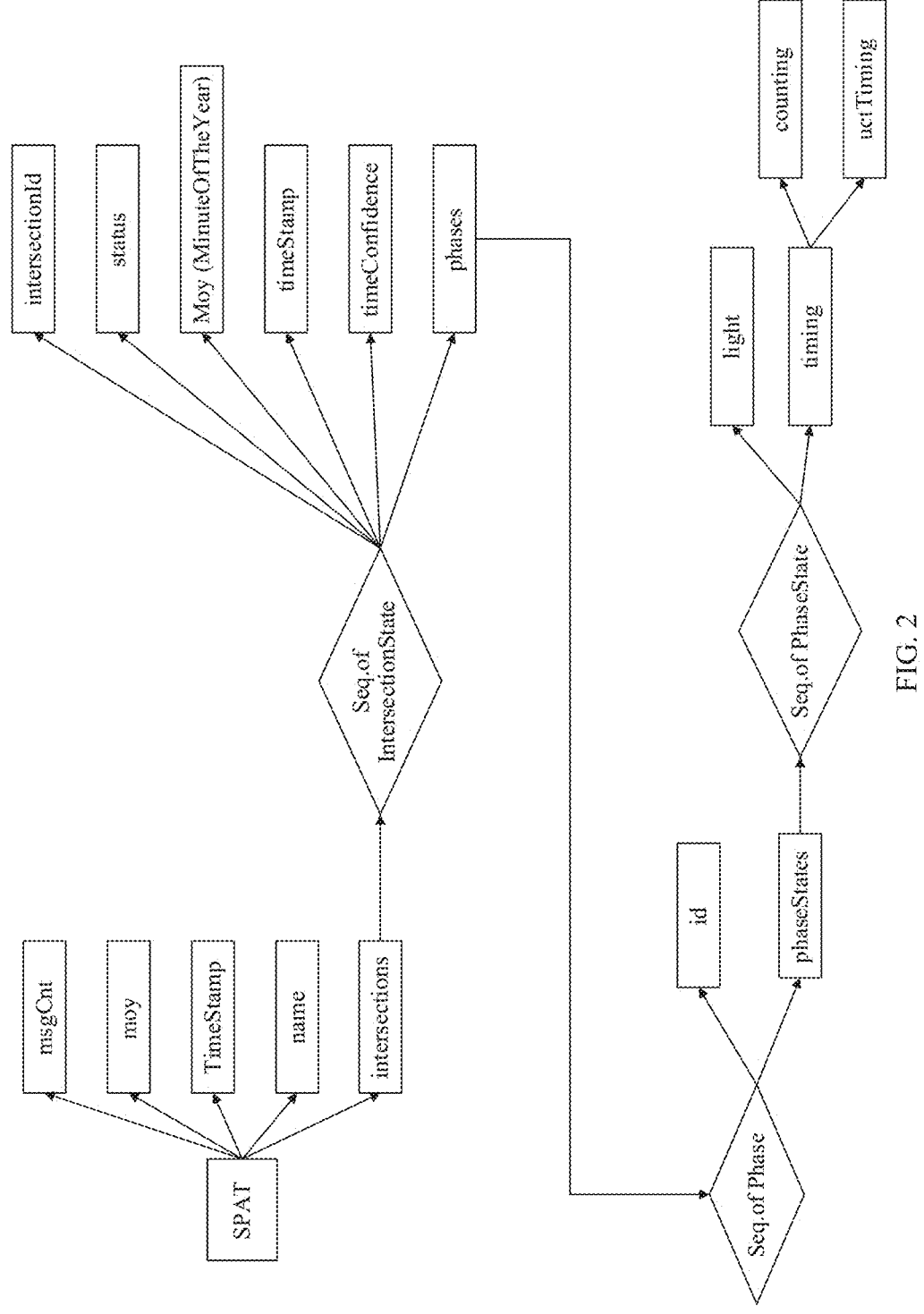
FIG. 2 is a schematic diagram of a structure of a SPAT message according to an embodiment of the present disclosure.

The SPAT message is used to transmit current status information (for example, a light color and time) of one or more traffic signal lights at a junction. FIG. 2 is a schematic diagram of a structure of the SPAT message according to an embodiment of the present disclosure. As shown in FIG. 2, the structure of the SPAT message is a form of nested layers. For example, the SPAT message may include one or more of the following fields: an information serial number (msgCnt), a time stamp (timeStamp), all minutes that have passed since the start of a current year (Moy), a name, and a set of intersections (intersections).

For any intersection in the set of intersections, an information sequence Seq.of IntersectionState may include an intersection ID, an intersection traffic signal light status (status), all minutes that have passed since the start of a current year (Moy, MinuteOfThe Year), a timestamp (timeStamp), a time confidence (timeConfidence), and a set of intersection traffic signal light phases (phases).

For any traffic signal light phase in the set of traffic signal light phases, an information sequence Seq.of Phase may include a phase ID and a corresponding set of phase states (phaseStates). For any phase state (phaseState) in the set of phase states, an information sequence Seq.of PhaseState may include a light color (light) (for example, a red light, a green light, or a yellow light) corresponding to the state, and time information (timing) (including remaining time (counting) and standard time (uctTiming)).

3. High Definition MAP (HDMAP)

Figure 3:
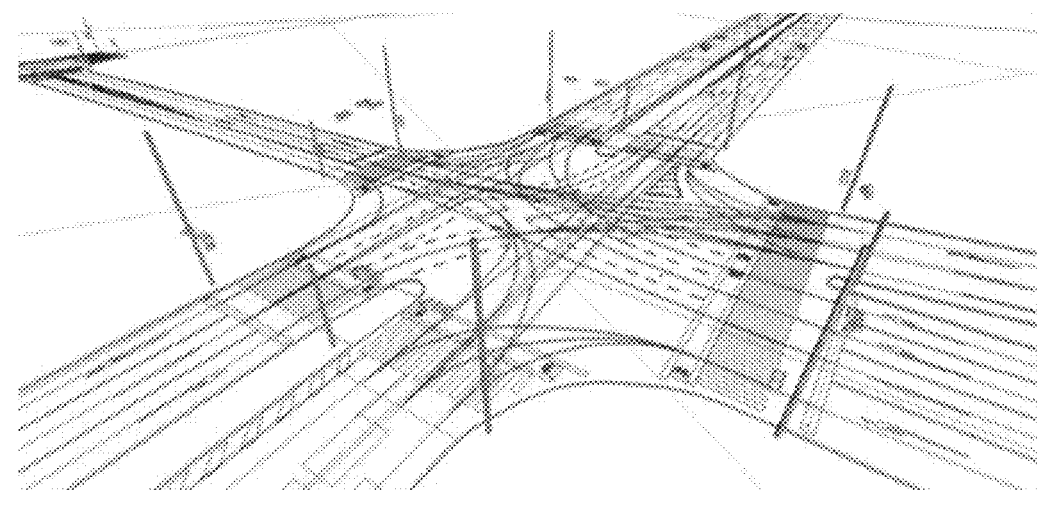
FIG. 3 is a schematic diagram of a map showing a junction according to an embodiment of the present disclosure.

A map plays an important role in the field of intelligent driving, and can help a vehicle perceive complex road surface information in advance, for example, an incline, a curvature, and a heading, to assist the vehicle in making right decisions based on intelligent path planning. FIG. 3 is a schematic diagram of a map showing a junction according to an embodiment of the present disclosure. The map is very different from a regular navigation map (for example, an in-vehicle standard navigation map) mainly in that users are different, purposes are different, systems are different, and elements, attributes, and the like are different. In terms of the elements and attributes, a regular navigation map generally includes a simple road line, a point of information (POI), an administrative boundary, and the like. As shown in FIG. 3, the map may include a detailed road model, for example, a lane model (for example, a road, a link, a lane, a lane edge line, a lane center line, and a lane stop line), a road component (for example, a traffic sign and a signage), a road attribute (for example, a curvature, a heading, or an incline), and another localization layer. The regular navigation map is used by a person for navigation and search, while the map is used by an intelligent driving vehicle for high-precision localization, assisted environment perception, planning, decision-making, and the like. For example, the intelligent driving vehicle may compare environment information sensed by a sensor with the map, to obtain a precise location of the vehicle on the map, thereby implementing high-precision localization. For example, the intelligent driving vehicle may verify environment perception based on detailed road information marked on the map. For example, the sensor of the intelligent driving vehicle senses a pit on a road ahead, and may compare the pit with the road information on the map. If a same pit is marked on the map, the sensed environment information is verified to be accurate. For example, the intelligent driving vehicle may further learn, by using the map, road condition information of an area (for example, several kilometers away) that cannot be sensed by the sensor, to perform path planning and decision-making for avoidance in advance.

4. On-Board Camera

An on-board camera is a photographing device mounted on a vehicle and configured to sense environments inside and outside the vehicle. The on-board camera is fundamental for visual image processing, that is, for visual-based information perception, and is applicable to target identification, for example, traffic signal light classification, lane ID identification, and lane line identification. An intelligent driving vehicle is usually equipped with a plurality of on-board cameras. The on-board cameras upload images captured from a plurality of angles to the vehicle. In a blind area that cannot be seen with human eyes, the vehicle can still obtain accurate pedestrian information, to determine whether there is a potential danger around the vehicle by identifying another vehicle, a pedestrian, and the like on a road.

For example, when the intelligent driving vehicle travels to a junction with a traffic signal light, the on-board cameras may photograph a road condition ahead for driving, for example, may photograph an obstacle, for example, a vehicle or a pedestrian ahead, to determine a distance between the vehicle and each obstacle; and may further identify information about a road ahead and a road sign, for example, identify a direction sign on a lane, and determine an allowed turning behavior on the lane, and for another example, identify a lane stop line to control a traveling speed of the vehicle. A traffic signal light ahead may be further sensed to determine a current status of the traffic signal light.

5. Coordinate System Offset

In a process of drawing a map, the following three types of map coordinate systems are usually used: a World Geodetic System-1984 Coordinate System (WGS-84) coordinate system, a Guojia Cehuiju-02 (GCJ-02) coordinate system, and a Baidu-09 (BD-09) coordinate system.

The WGS-84 coordinate system is generally latitude and longitude information recorded by an international GPS logger. The GCJ-02 coordinate system, also referred to as a "Mars coordinate system", is a coordinate system originally developed by the National Administration of Surveying, Mapping, and Geoinformation of China, and is encrypted based on the WGS-84 coordinate system. The GCJ-02 coordinate system is used in Amap and GOOGLE MAPS®. The BD-09 coordinate system is a coordinate system further encrypted, with offsets, based on the GCJ-02 coordinate system, and is only used in Baidu Map at present.

The GCJ-02 coordinate system and the BD-09 coordinate system are encrypted with offsets according to different encryption algorithms, so that for a same geographical spot, latitude and longitude information corresponding to the WGS-84 coordinate system, the GCJ-02 coordinate system, and the BD-09 coordinate system is different.

An application scenario to which technical solutions provided in embodiments of the present disclosure are applicable is described below.

Figure 4:
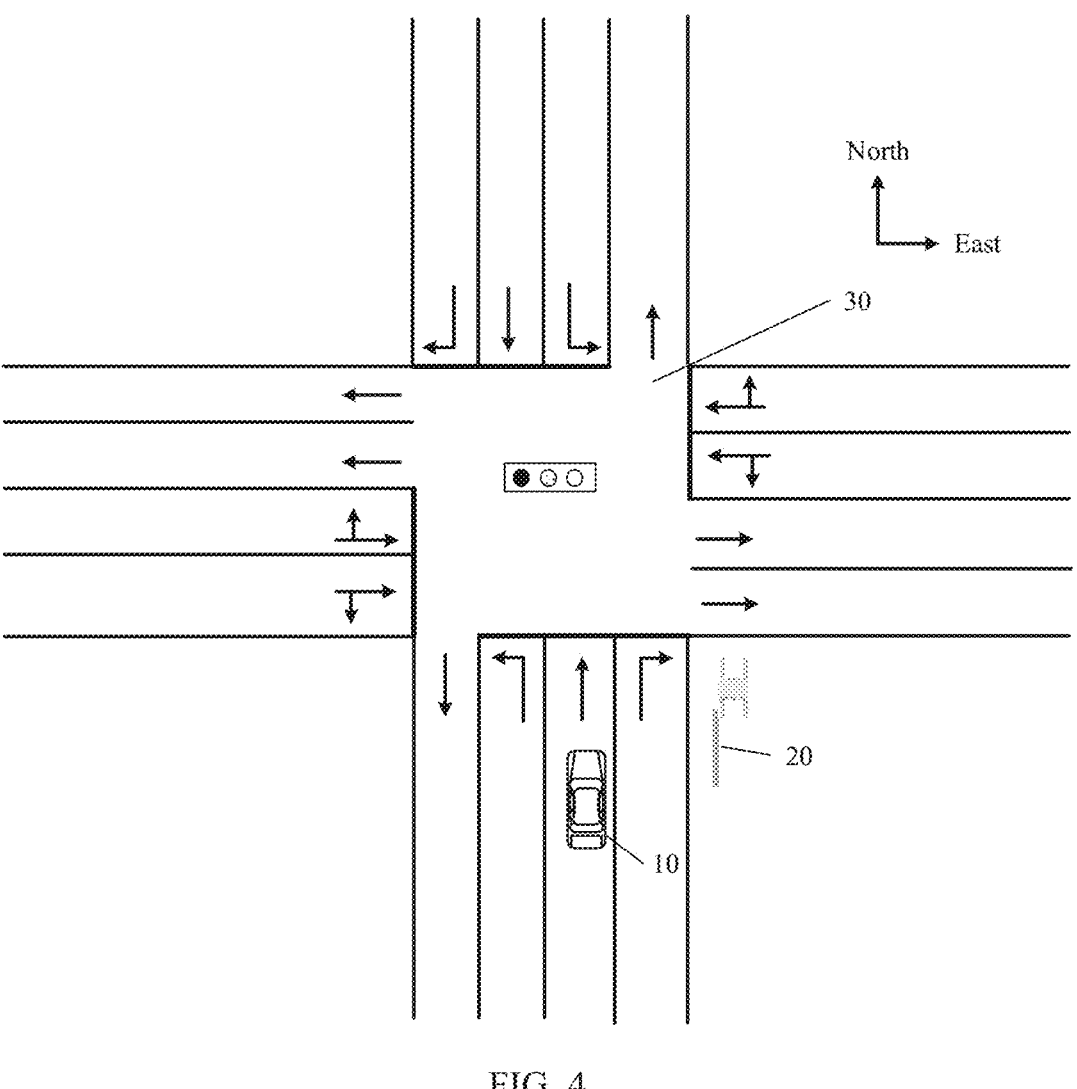
FIG. 4 is a schematic diagram of an application scenario to which a method for obtaining traffic information according to an embodiment of the present disclosure is applicable.

FIG. 4 is a schematic diagram of an application scenario to which a method for obtaining traffic information according to an embodiment of the present disclosure is applicable. As shown in FIG. 4, the application scenario may include a vehicle 10, a road side device 20, and a junction 30.

For example, the junction 30 may be a junction at which traffic signal lights are disposed, for example, a crossroad, a T-junction, or a roundabout (a crossroad is used as an example in the figure), or may be a road location, connected to an entrance or an exit of a building, at which traffic signal lights are disposed, for example, an entrance or an exit of a school.

For example, the vehicle 10 may be an intelligent driving vehicle configured with an automated driving system (ADS), advanced driver assistance systems (ADAS), or the like.

For example, the road side device 20 may include a device, for example, a traffic signal controller, a signage, and a server. The traffic signal controller may pre-store a rule of operating traffic signal lights at the junction 30. The rule of operating the traffic signal lights may include any moment and phase information of the traffic signal lights corresponding to any moment, to help the traffic signal controller control display of the traffic signal lights in real time. For example, one traffic signal controller may be disposed at the junction 10, and each link at the junction 30 corresponds to one group of red, yellow, and green traffic signal lights. The traffic signal controller may control a display process of all traffic signal lights at the junction 30. For example, a plurality of traffic signal controllers may be disposed at the junction 30, and each of the traffic signal controllers may control a display process of a corresponding traffic signal light. As shown in FIG. 4, a link extending from south to north in which the vehicle 10 is located includes three lanes, that is, a left-turn lane, a straight lane, and a right-turn lane. In this case, the link may correspond to a group of traffic signal lights, and the group of traffic signal lights includes a traffic signal light that indicates a left turn, a traffic signal light that indicates going straight, and a traffic signal light that indicates a right turn. The traffic signal light that indicates a left turn is associated with the left-turn lane in the link, the traffic signal light that indicates going straight is associated with the straight lane in the link, and the traffic signal light that indicates a right turn is associated with the right-turn lane in the link. That is, each of the traffic signal lights is used to regularly indicate a specific lane in a link in a specific direction. It can be understood that, when one lane allows a plurality of turning behaviors, a plurality of traffic signal lights are associated with the lane. For example, a lane on which a left turn is allowed and going straight is also allowed is associated with both the traffic signal light that indicates a left turn and the traffic signal light that indicates going straight.

For example, an on-board unit may be deployed on the vehicle 10, and a road side unit may be deployed on the road side device 20, so that V2I information is exchanged between the vehicle 10 and the road side device 20.

Figure 5:
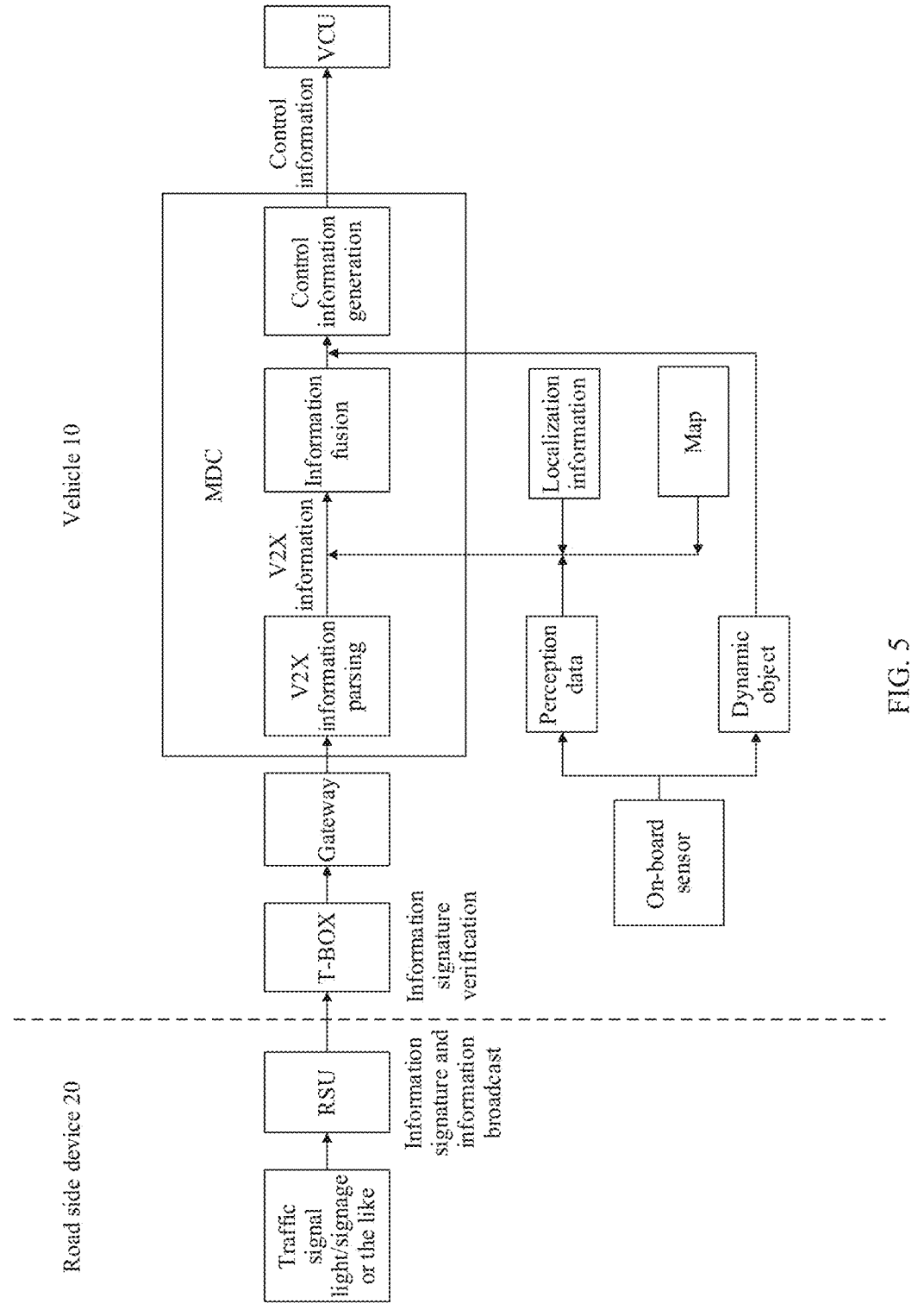
FIG. 5 is a schematic diagram of exchanging Vehicle-to-Infrastructure (V2I) information between a vehicle and a road side device according to an embodiment of the present disclosure.

FIG. 5 is a schematic diagram of exchanging V2I information between a vehicle and a road side device according to an embodiment of the present disclosure. As shown in FIG. 5, a road side unit deployed in a road side device 20 may obtain information related to, for example, a traffic signal controller or a signage, encapsulate the obtained related information, and broadcast the V2I information around. For example, the road side unit may perform information signature on information, for example, a traffic signal light, traffic management, and a road condition, and then broadcast the information through Long Term Evolution-Vehicle (LTE-V) or in another manner. After receiving the V2I information broadcast by the road side unit, the on-board unit deployed on the vehicle 10 performs further processing. For example, the on-board unit may include a telematics box (T-Box) and a mobile data center (MDC). The T-box performs information signature verification on the received V2I information, and transmits, after the signature verification is successful, the V2I information to the MDC via a gateway (GW). The MDC parses the V2I information, combines multi-source information, and generates control information. For example, the MDC may perform information fusion based on perception data, a dynamic object, vehicle localization information, a map, or the like acquired by an on-board sensor, and generate warning information and the control information. The MDC sends the control information to a vehicle control unit (VCU), and the VCU performs a corresponding action based on the received control information.

In some scenarios, the road side device 20 may broadcast V2I MAP information and a V2I SPAT message. For example, the V2I SPAT message may include a phase ID of each traffic signal light at a junction 30, a current light color (for example, a red light, a green light, or a yellow light) and time information (for example, remaining time) corresponding to the phase identifier, and the like. For example, the V2I MAP information may include an ID (lane ID) of each lane at the junction 30, a phase ID of a traffic signal light corresponding to each lane, an allowed turning behavior (for example, a left turn, straight going, a right turn, or a U-turn) at a lane exit, and location information (for example, latitude and longitude information of a lane center line, latitude and longitude information of a lane edge line, or latitude and longitude information of a lane stop line) of the lane, and the like.

It should be noted that, the phase identifier, namely, the phase ID, of the traffic signal light included in the V2I MAP information and the V2I SPAT message is an only association between the V2I MAP information and the V2I SPAT message. Seq.of Phase corresponding to each phase ID in the SPAT message indicates a phase of a traffic signal light corresponding to one or more lanes that allow a same turning behavior (for example, all allow a left turn) at an intersection. Because each traffic signal light at the junction 30 is pre-associated with each lane, before sending the V2I MAP information and the SPAT message to the on-board unit, the road side unit may match a phase ID in the V2I MAP information with an ID in Seq.of Phase of the V2I SPAT message according to a pre-specified rule. For example, a phase ID of a traffic signal light corresponding to each lane, that is, a phase ID corresponding to each lane ID in the V2I MAP information, is determined based on an association relationship between each traffic signal light and each lane in a sequence from left to right (from an inner side to an outer side) of lanes in each link in a counterclockwise direction from south to north.

Figure 6:
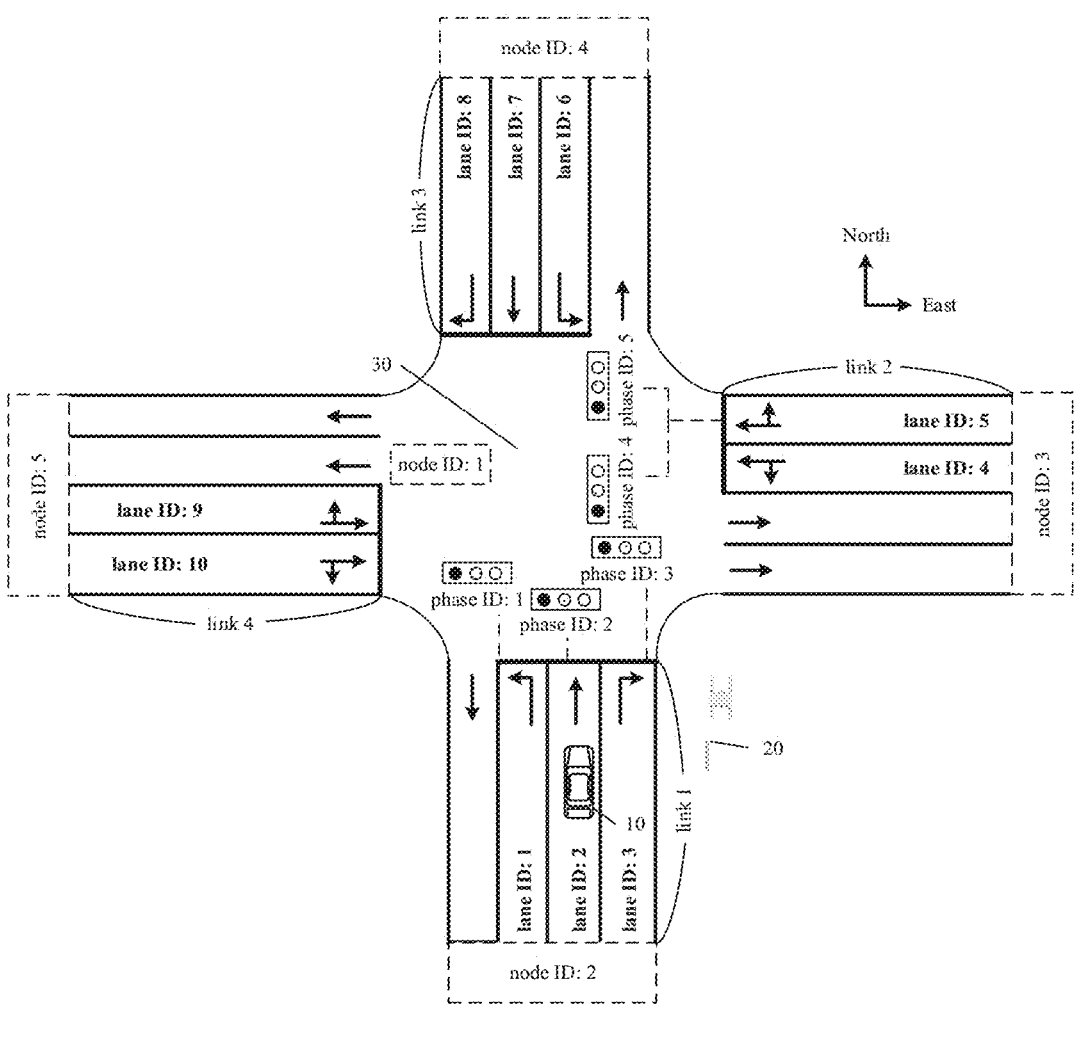
FIG. 6 is a schematic diagram of road information of a junction 30 in FIG. 4 indicated by V2I MAP information according to an embodiment of the present disclosure.

FIG. 6 is a schematic diagram of road information that is of the junction 30 in FIG. 4 and that is indicated by V2I MAP information according to an embodiment of the present disclosure. As shown in FIG. 6, in the V2I MAP information, a node ID of the junction 30 at which the vehicle 10 is currently located is 1, and other junctions connected to the junction 30 are with a node ID that is 2, a node ID that is 3, and the like respectively. Links between the junction 30 and other junctions are a link 1, a link 2, a link 3, and a link 4 respectively. A unique lane ID is set for each lane in each link at the junction 30, and an ID of each lane at the junction 30 may be set to a lane ID that is 1, a lane ID that is 2, and the like. Four groups of traffic signal lights (not shown in the figure) are disposed at the junction 30, and each of the groups of traffic signal lights corresponds to an allowed turning behavior on each lane in the link. As shown in FIG. 6, a lane on which the vehicle 10 is currently located is a straight lane in the link 1 with a lane ID that is 2. A group of traffic signal lights associated with the link 1 includes three traffic signal lights. A unique phase ID is set for each of the traffic signal lights, that is, a phase ID that is 1, a phase ID that is 2, and a phase ID that is 3. The phase ID is the ID in Seq.of Phase in the SPAT message. A phase ID corresponding to each lane ID, corresponding to the link 1, in the MAP information may be determined based on an association relationship between the three traffic signal lights and three lanes in the link 1. To be specific, a left-turn lane with the lane ID that is 1 corresponds to the phase ID that is 1, a straight lane with the lane ID that is 2 corresponds to the phase ID that is 2, and a right-turn lane with a lane ID that is 3 corresponds to the phase ID that is 3. A group of traffic signal lights associated with the link 2 includes three traffic signal lights (only two are shown in the figure). A phase ID corresponding to each lane ID, corresponding to the link 2, in the MAP information may be determined based on an association relationship between the three traffic signal lights and two lanes in the link 2. To be specific, a lane, with a lane ID that is 5, that allows a right turn and going straight corresponds to a phase ID that is 4 and a phase ID that is 5. Allowing right-turn corresponds to the phase ID that is 5, and going straight corresponds to the phase ID that is 4.

For example, for each of the traffic signal lights, the road side unit may periodically obtain information, for example, a corresponding link direction, an indicated turning behavior, a color of the traffic signal light, and remaining time of the traffic signal light. For example, the phase ID that is 2 may be used as an example, and "direction from south to north, going straight, red light, and 10 s" may be obtained, and it indicates a lane, in a link extending from south to north, that allows going straight; a current light color, that is, a red light, of a corresponding traffic signal light; and remaining time of the red light, that is, 10 s. The "red light and 10 s" is traffic signal light status information corresponding to the phase ID that is 2. Further, traffic signal light status information corresponding to each phase ID may be determined in a preset sequence. Each phase ID corresponding to the junction 30 (or a link at the junction 30), the corresponding traffic signal light status information, and the like are encapsulated into a V2I SPAT message. For example, each lane ID corresponding to the junction 30 (or a link at the junction 30), a phase ID corresponding to the lane ID, an allowed turning behavior of a corresponding lane, location information of the lane, and the like may be encapsulated into the V2I MAP information.

The road side unit broadcasts the SPAT message and the MAP information. For example, the on-board unit receives and parses the V2I SPAT message and the V2I MAP information. The on-board unit may obtain location information of the vehicle 10 (for example, latitude and longitude information of the vehicle 10 that is determined based on a Global Navigation Satellite System (GNSS) signal), and match the location information of the vehicle 10 with the location information (for example, latitude and longitude information of a lane center line) of the lane in the V2I MAP information, to locate a lane on which the vehicle is located (that is, a lane corresponding to the MAP information), to obtain a lane ID of the lane. As shown in FIG. 6, the lane ID of the lane on which the vehicle 10 is located is 2. Further, the on-board unit may search for the V2I MAP information based on the lane ID, and determine a corresponding phase ID. As shown in FIG. 6, the lane ID that is 2 corresponds to the phase ID that is 2. When one lane ID corresponds to a plurality of phase IDs, a unique phase ID may be determined in the plurality of phase IDs based on an expected turning direction of the vehicle. For example, if the vehicle is located on a lane with a lane ID that is 4 in FIG. 6, and the vehicle expects to turn right, a phase ID corresponding to a right-turn direction on the lane with the lane ID that is 4 is determined. Further, the on-board unit looks into, based on the obtained phase ID, traffic signal light status information corresponding to the phase ID in the V2I SPAT message. For example, a current light color of a traffic signal light corresponding to the phase ID that is 2 is a red light, and remaining time of the red light is 10 s. In this way, the traffic signal light status information may be fused with multi-source information to generate control information, to control the vehicle 10 to safely pass the junction 30.

However, due to factors such as an obstacle of a building or a tree, signal interference, a tunnel area, and a multipath effect, the determined latitude and longitude information of the vehicle may deviate from an actual location of the vehicle. In this case, when the on-board unit matches the latitude and longitude information with latitude and longitude information of each lane in the V2I MAP information, it cannot be ensured that the lane on which the vehicle is located is accurately located. As a result, accuracy of obtained traffic signal light status information is affected. For example, as shown in FIG. 6, when there is a deviation in the latitude and longitude information of the vehicle 10, the on-board unit may locate the vehicle 10 on a right-turn lane, with the lane ID that is 3, adjacent to the lane on which the vehicle is actually located. As a result, incorrect traffic signal light status information is obtained, and driving safety is affected.

In addition, when different maps are used for the V2I MAP information and an in-vehicle map, because a weather condition, measurement time, a measurement manner, a measurement device, measurement precision, a coordinate system, and the like may be different in a process of drawing a map, for a same geographical spot, a corresponding latitude and longitude in the V2I MAP information may be different from a corresponding latitude and longitude on the in-vehicle map. In this way, when the on-board unit matches latitude and longitude information of the vehicle determined based on the in-vehicle map with the latitude and longitude information of each lane in the V2I MAP information, a matching result may be inaccurate, and it cannot be ensured that the lane on which the vehicle is located is accurately located. As a result, accuracy of obtained traffic signal light status information is affected.

To resolve the foregoing technical problem, the present disclosure provides a method for obtaining traffic information. The method may be performed by the foregoing on-board unit.

Figure 7:
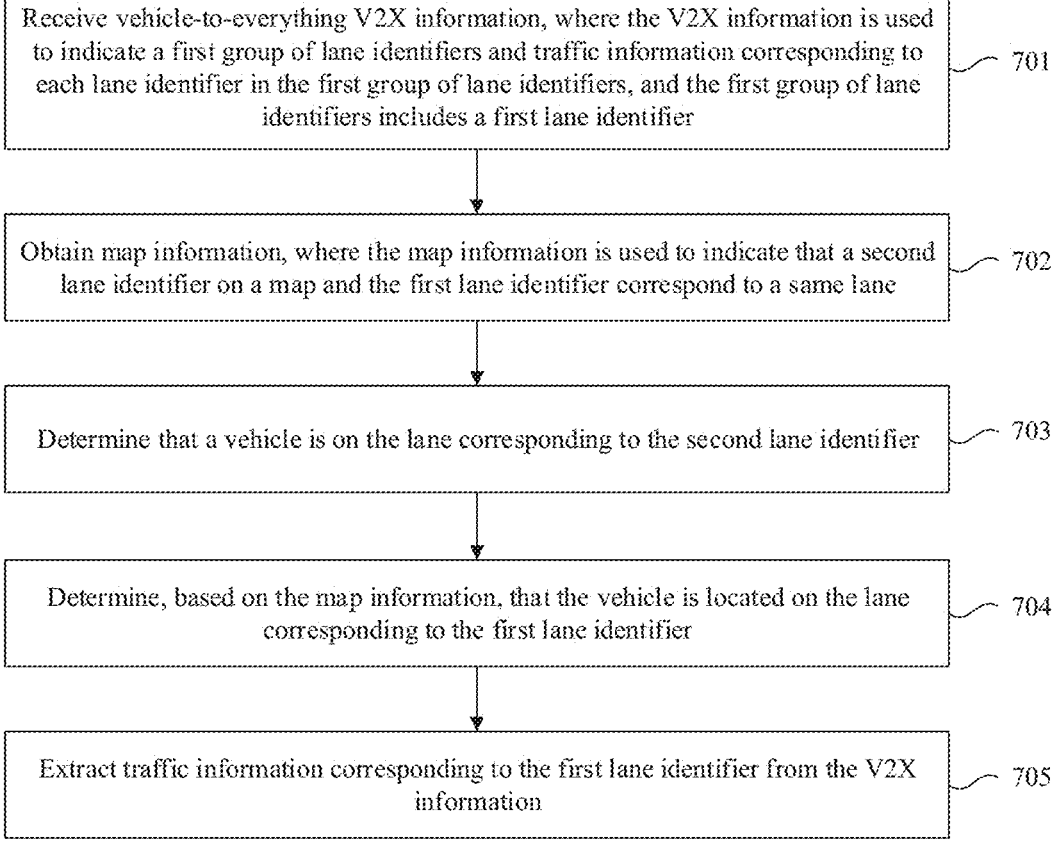
FIG. 7 is a flowchart of a method for obtaining traffic information according to an embodiment of the present disclosure.

FIG. 7 is a flowchart of a method for obtaining traffic information according to an embodiment of the present disclosure. As shown in FIG. 7, the method may include the following steps.

Step 701: Receive V2X information.

For example, an on-board unit may receive the V2X information broadcast by a road side unit; or an on-board unit may actively request a road side unit to provide the V2X information. For example, the V2X information may include V2I information. The on-board unit may be the on-board unit deployed on the vehicle 10 shown in FIG. 4. The road side unit may be the road side unit deployed at the junction 30. When the vehicle 10 travels near the junction 30, the on-board unit may receive the V2I information sent by the road side unit.

The V2X information indicates a first group of lane identifiers, and for example, the first group of lane identifiers may include one or more lane identifiers. A first group of lanes may include one or more lanes, for example, may include one or more lanes in a link in which a vehicle is located, and may further include one or more lanes in each link at a junction ahead the vehicle. Each lane in the first group of lanes corresponds to one lane ID in the first group of lane identifiers. For example, the first group of lane identifiers may include a first lane identifier. The first group of lanes includes a lane on which the vehicle is located, and the lane corresponds to the first lane identifier. For example, as shown in FIG. 4, the first group of lanes may include the straight lane, the left-turn lane, and the right-turn lane in the link, extending from south to north, in which the vehicle 10 is located, and each of the lanes corresponds to one lane identifier. The straight lane is the lane on which the vehicle 10 is located, and the straight lane corresponds to the first lane identifier.

The V2X information further indicates traffic information corresponding to each lane identifier. For example, the traffic information may include one or more of traffic signal light status information, traffic management information (for example, a type of a vehicle allowed to pass, a road name, a transit time, and speed limit information), road condition information, and allowed turning information (for example, about turning left, turning right, going straight, or making a U-turn), lane location information (for example, latitude and longitude information of a lane center line, latitude and longitude information of a lane edge line, or latitude and longitude information of a lane stop line), a lane width, a lane attribute (for example, lane sharing information, a curvature, a heading, or an incline of a lane), a link width, a lane connection relationship, and the like.

In a possible implementation, the V2X information may include V2X MAP information. The V2X MAP information may include a laneID field, and the laneID field indicates the first group of lane identifiers. For example, each lane ID in the first group of lane identifiers may correspond to one value of the laneID field, and different lane identifiers correspond to different values of the laneID field. For example, as shown in FIG. 6, for the three lanes in the link extending from south to north at the junction 30, the lane ID that is 1 is a lane ID corresponding to the left-turn lane in the link, and the lane ID that is 2 is a lane ID corresponding to the straight lane in the link, and the lane ID that is 3 is a lane ID corresponding to the right-turn lane in the link. The lane ID that is 2 is the first lane identifier.

For example, the V2X MAP information may further include one or more fields shown in FIG. 1 and indicate traffic information corresponding to a lane ID. For example, the V2X MAP information may further include a laneWidth field, a laneAttributes field, a maneuvers field, a connectsTo field, a points field, a speedLimits field, and a link Width field. The laneWidth field indicates a width of a lane corresponding to the lane ID, the laneAttributes field indicates an attribute of the lane corresponding to the lane ID, the maneuvers field indicates an allowed turning behavior, corresponding to the lane ID, at a lane exit, the speedLimits field indicates speed limit information of the lane corresponding to the lane ID or speed limit information of a link including the lane corresponding to the lane ID; the link Width field indicates a width of the link including the lane corresponding to the lane ID; and the points field indicates a set of feature points of the lane corresponding to the lane ID, where the feature points include feature points on a lane center line, a lane edge line, or a lane stop line, and the set of feature points includes location information of each feature point (that is, location information of the lane). The connectsTo field indicates a set of connection relationships between the lane corresponding to the lane ID and a lane in a downstream link. An information sequence of the connectsTo field may include a remote intersection field, a connectingLane field, and a phaseID field. The remote intersection field indicates a remote intersection in the downstream link corresponding to the lane ID, the connectingLane field indicates the lane in the downstream link connected to the lane corresponding to the lane ID, and the phaseID field indicates a phase ID of a traffic signal light, at a local junction, on the lane corresponding to the lane ID.

In a possible implementation, the V2X information may include a V2X SPAT message. The V2X SPAT message may include a phaseID field, and the phaseID field indicates the first group of lane identifiers. For example, each lane ID in the first group of lane identifiers may correspond to one or more values of the phaseID field. For example, as shown in FIG. 6, for the three lanes in the link extending from south to north at the junction 30, the phase ID that is 1 is a lane ID corresponding to the left-turn lane in the link, and the phase ID that is 2 is a lane ID corresponding to the straight lane in the link, and the phase ID that is 3 is a lane ID corresponding to the right-turn lane in the link. The phase ID that is 2 is the first lane identifier. For another example, as shown in FIG. 6, for a lane in a link extending from east to west at the junction 30, the phase ID that is 4 and the phase ID that is 5 are lane identifiers corresponding to a right-side lane (that is, a lane that allows a right turn and going straight) in the link.

For example, the V2X SPAT message may further include one or more fields shown in FIG. 2 and indicate traffic information corresponding to a phase ID. For example, the V2X SPAT message may further include a phaseStates field. The phaseStates field indicates traffic signal light status information corresponding to the phase ID. For example, as shown in FIG. 2, an information sequence of the phaseStates field may include a light field and a timing field. The light field indicates a light color (for example, a red light, a green light, or a yellow light) corresponding to the phase ID, and the timing field indicates remaining time of the light color and the like.

Step 702: Obtain map information, where the map information indicates that a second lane ID on a map and the first lane ID correspond to a same lane.

The map may be pre-installed on a vehicle, or may be obtained from a cloud server. The map may include a second group of lane identifiers. For example, the second group of lane identifiers may include one or more lane identifiers. A second group of lanes may be the same as the foregoing first group of lanes. Each lane in the second group of lanes corresponds to one lane ID in the second group of lane identifiers. For example, the second group of lane identifiers may include the second lane identifier, and a lane, in the second group of lanes, on which the vehicle is located corresponds to the second lane identifier.

Figure 8:
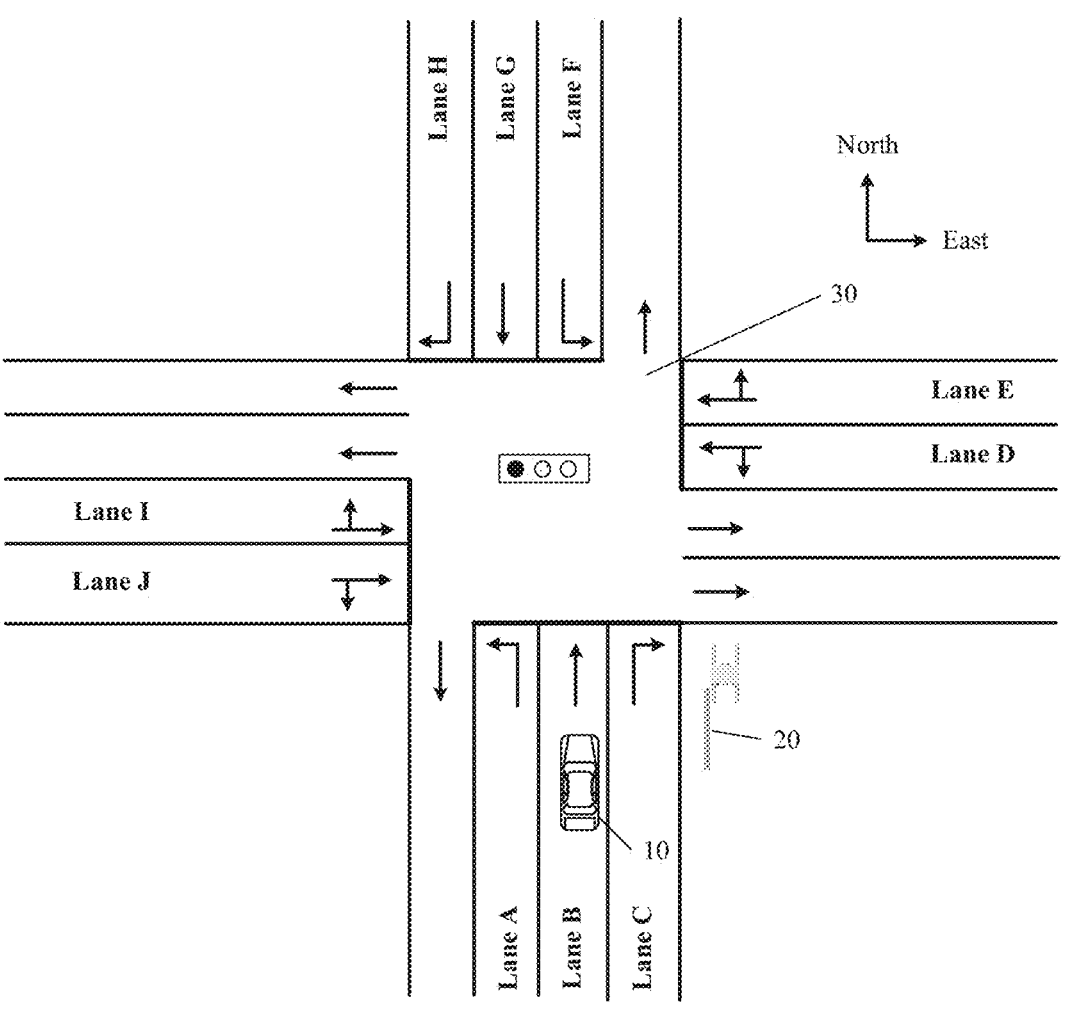
FIG. 8 is a schematic diagram of lane identifiers corresponding to lanes of a junction 30 on a map in FIG. 4 according to an embodiment of the present disclosure.

For example, different characters may indicate different lane identifiers in the second group of lane identifiers. For example, a lane X may indicate the second group of lane identifiers, where X may be any letter of A, B, C, and so on. Different lane identifiers in the second group of lane identifiers each correspond to a different lane X. For example, FIG. 8 is a schematic diagram of a lane ID corresponding to each lane at the junction 30 in FIG. 4 on the map according to an embodiment of the present disclosure. As shown in FIG. 8, for three lanes in a link extending from south to north at a junction 30, a lane A is a lane ID corresponding to a left-turn lane in the link, and a lane B is a lane ID corresponding to a straight lane in the link, and a lane C is a lane ID corresponding to a right-turn lane in the link. The lane B is the second lane identifier.

For example, the map may include the map information. The on-board unit may extract the map information from the map. For example, the on-board unit may receive the map information sent by the road side unit, or may obtain the map information from a cloud server. It can be understood that, for a same lane, the lane is represented on the map by one lane ID in the second group of lane identifiers, and the lane is represented in the V2X information by one lane ID in the first group of lane identifiers. Therefore, the lane identifiers, indicating the same lane, in the second group of lane identifiers and in the first group of lane identifiers may be matched in advance, to determine a correspondence between a lane ID on the map and a lane ID in the V2X information. For example, for the lane on which the vehicle is located, the lane is represented on the map by the second lane identifier, and the lane is represented in the V2X information by the first lane identifier. In this case, a correspondence between the first lane ID and the second lane ID may be determined in advance, that is, the map information that indicates that the second lane ID and the first lane ID correspond to a same lane may be determined.

In an example, the V2X information includes the V2X MAP information. As shown in FIG. 6, the lane ID that is 2 in the V2X MAP information is the first lane identifier, and represents the straight lane in the link extending from south to north at the junction 30. As shown in FIG. 8, the lane B on the map is the second lane identifier, and represents the straight lane in the link extending from south to north at the junction 30. In this case, the map information may indicate that the lane B and the lane ID that is 2 correspond to a same lane, that is, both correspond to the straight lane in the link extending from south to north at the junction 30.

In another example, the V2X information includes the V2X SPAT message. As shown in FIG. 6, the phase ID that is 2 in the V2X SPAT message is the first lane identifier, and represents the straight lane in the link extending from south to north at the junction 30. As shown in FIG. 8, the lane B on the map is the second lane identifier, and represents the straight lane in the link extending from south to north at the junction 30. In this case, the map information may indicate that the lane B and the phase ID that is 2 correspond to a same lane, that is, both correspond to the straight lane in the link extending from south to north at the junction 30.

Step 703: Determine that the vehicle is on a lane corresponding to the second lane identifier.

In a possible implementation, the on-board unit may obtain perception data by using a perception device on the vehicle, and match the perception data with data on the map, to determine that the vehicle is on the lane corresponding to the second lane identifier.

For example, the on-board unit may obtain, based on an estimated location of the vehicle, data on the map within a specific area with the estimated location as a center, and match the data with the perception data, to reduce a data volume and improve data processing efficiency. The estimated location may include a location of the vehicle determined based on real-time kinematic (RTK), and may further include a location of the vehicle obtained through recursion based on a historical location of the vehicle in one or more manners of visual mileage recursion, inertial measurement recursion, vehicle odometer recursion, and the like.

The perception device may include one or more of sensors, such as an on-board camera, a millimeter-wave radar, a lidar, and an ultrasonic radar. For example, fusion perception may be performed based on data acquired by the plurality of types of sensors, to identify an object (for example, an obstacle, a lane line, or a road surface traffic sign) around the vehicle, and then match an identification result with the data on the map, to determine that the vehicle is on the lane corresponding to the second lane identifier.

For example, the perception device is an on-board camera. The on-board unit may obtain, by using the on-board camera, a road surface direction sign on the lane on which the vehicle is located and a lane edge line of the lane; and match the road surface direction sign and the lane edge line with a road surface direction sign and a lane edge line on the map, to determine that the vehicle is on the lane corresponding to the second lane identifier. As shown in FIG. 8, the estimated location of the vehicle 10 is the link extending from south to north at the junction 30. Information on the map, for example, a road surface direction sign in the link and a lane edge line of a lane is obtained. The on-board camera photographs a road surface going-straight sign (that is, an arrow for going straight on a road surface) and a lane edge line of the straight lane on which the vehicle 10 is located. The on-board unit matches the road surface going-straight sign and the lane edge line with the obtained information about the link on the map, to determine that a lane represented by the lane B on the map is a lane on which the vehicle 10 is located. That is, the vehicle 10 is located on a lane corresponding to the lane B.

Step 704: Determine, based on the map information, that the vehicle is located on the lane corresponding to the first lane identifier.

The map information indicates that the second lane ID and the first lane ID correspond to a same lane. In this way, when it is determined that the vehicle is on the lane corresponding to the second lane identifier, it may be determined, based on the map information, that the vehicle is on the lane corresponding to the first lane identifier, that is, the vehicle is on the lane indicated by the first lane ID in the V2X information, thereby accurately localization the lane on which the vehicle is located.

In an example, the lane ID that is 2 shown in FIG. 6 is the first lane identifier, and the map information indicates that the lane B and the lane ID that is 2 correspond to a same lane. Based on that it is determined that the vehicle 10 is on the lane corresponding to the lane B, it may be determined that the vehicle 10 is on a lane corresponding to the lane ID that is 2, that is, the vehicle 10 is on a lane indicated by the lane ID that is 2 in the V2X MAP information.

In another example, the phase ID that is 2 shown in FIG. 6 is the first lane identifier, and the map information indicates that the lane B and the phase ID that is 2 correspond to a same lane. Based on that it is determined that the vehicle 10 is on the lane corresponding to the lane B, it may be determined that the vehicle 10 is on a lane corresponding to the phase ID that is 2, that is, the vehicle 10 is on a lane indicated by the phase ID that is 2 in the V2X SPAT message.

Step 705: Extract traffic information corresponding to the first lane ID from the V2X information.

The traffic information corresponding to the first lane ID is extracted, by using the first lane identifier, from the V2X information based on the foregoing located lane on which the vehicle is located, that is, the lane corresponding to the first lane identifier. Based on the traffic information, path planning and decision-making can be further performed to adjust a driving maneuver of the vehicle, thereby reducing a traffic safety risk and improving traffic efficiency.

In an example, as shown in FIG. 6, if it is determined that the vehicle 10 is located on the lane corresponding to the lane ID that is 2, traffic information corresponding to the lane ID that is 2 may be determined. For example, speed limit information corresponding to the lane ID that is 2 in the V2X MAP information may be obtained, information about going straight that is allowed at an exit of the lane corresponding to the lane ID that is 2 may be further obtained, and the phase ID with the phase ID that is 2 of the traffic signal light at the local junction on the lane corresponding to the lane ID that is 2 may be further obtained. For example, when the V2X information includes the V2X MAP information and the V2X SPAT message, traffic signal light information corresponding to the phase ID that is 2 may be further obtained based on the V2X SPAT message.

In another example, as shown in FIG. 6, if it is determined that the vehicle 10 is on the lane corresponding to the phase ID that is 2, traffic information corresponding to the phase ID that is 2 may be determined. For example, the traffic signal light information corresponding to the phase ID that is 2 may be obtained based on the V2X SPAT message. For example, when the V2X information includes the V2X MAP information and the V2X SPAT message, both the phase ID that is 2 and the lane ID that is 2 correspond to the lane on which the vehicle 10 is located. In this case, the traffic information corresponding to the lane ID that is 2 may be further obtained based on the V2X MAP information.

For example, if the first lane ID includes a plurality of values of the phaseID field, that is, the lane on which the vehicle is located may allow maneuvers of turning to a plurality of directions, the on-board unit may determine, based on the V2X MAP information, a phase ID corresponding to an expected direction of turning of the vehicle, to obtain corresponding traffic signal light information. For example, as shown in FIG. 6, it is assumed that the vehicle is located on the right-side lane in the link extending from east to west at the junction 30, and the lane allows going straight and a right turn. In this case, the first lane ID includes the phase ID that is 4 and the phase ID that is 5, where the allowed right turn corresponding to the phase ID that is 5, and going straight corresponds to the phase ID that is 4. A lane ID that is 5 corresponding to the phase ID that is 4 and the phase ID that is 5 may be obtained based on the V2X MAP information. If the vehicle expects to turn right, a remote intersection with a node ID that is 4 in a downstream link corresponding to the lane ID that is 5 may be obtained, and the phase ID that is 5 corresponding to the node ID that is 4 may be determined, to obtain traffic signal light information corresponding to the phase ID that is 5 based on the V2X MAP information. Similarly, if the vehicle expects to go straight, a remote intersection with a node ID that is 5 in a downstream link corresponding to the lane ID that is 5 may be obtained, and the phase ID that is 4 corresponding to the node ID that is 5 may be determined, to obtain traffic signal light information corresponding to the phase ID that is 4 based on the V2X MAP information.

The traffic signal light status information may include a light color of a traffic signal light at a current moment, remaining time of the light color, and the like. Therefore, further, the on-board unit may perform path planning, speed control, and the like based on the traffic signal light status information with reference to information, for example, a speed of the vehicle. For example, when the light color of the traffic signal light is currently a green light and remaining time of the green light is relatively long, the vehicle may keep traveling at a current speed and pass the junction. For another example, when the light color of the traffic signal light is currently a green light, and remaining time of the green light is relatively short, as the traffic signal light is going to turn red, the vehicle may slow down and control the vehicle to stop within a lane stop line. In this way, based on accurate lane localization described above, accurate traffic signal light status information can be obtained, to ensure that the vehicle can travel in the right way according to traffic rules, thereby improving vehicle driving safety.

In this embodiment of the present disclosure, the map information indicates that the second lane ID on the map and the first lane ID (for example, a lane ID in the V2X MAP information or a phase ID in the V2X SPAT message) in the V2X information correspond to the same lane. After it is determined that the vehicle is on the lane corresponding to the second lane identifier, it may be determined, based on the map information, that the vehicle is on the lane corresponding to the first lane identifier, to ensure to accurately and quickly locate the lane on which the vehicle is located. In this way, the traffic information corresponding to the first lane ID may be extracted from the received V2X information, thereby ensuring accuracy of the obtained traffic information. In addition, in the method, the map information is used, so that there is no dependence on precision of localization coordinate information (for example, latitude and longitude information in GNSS signal-based localization).

Not only accuracy of the obtained traffic information is ensured, applicability of the method is also improved.

FIG. 9 is a flowchart of a localization method according to an embodiment of the present disclosure. The method may be performed by the foregoing on-board unit. As shown in FIG. 9, the method may include the following steps.

Step 901: Receive V2X MAP information from a road side device.

For example, an on-board unit may receive the V2X MAP information broadcast by a road side unit (deployed in the road side device); or an on-board unit may actively request a road side unit to provide the V2X MAP information. For example, the on-board unit may be the on-board unit deployed on the vehicle 10 shown in FIG. 4. The road side unit may be the road side unit deployed at the junction 30. When the vehicle 10 travels near the junction 30, the on-board unit may receive the V2X MAP information sent by the road side unit.

For example, the V2X MAP information may include one or more fields shown in FIG. 1.

Step 902: Obtain first structure information of a road based on the V2X MAP information.

The structure information indicates one or more of a lane attribute, a lane location, and a lane width. For example, the lane attribute may include a curvature, a heading, an incline, or the like of the lane. The lane location may include a location of a lane line (for example, a location of a lane edge line, a location of a lane center line, or a location of a lane stop line). The location of the lane line may be determined based on location information of one or more feature points. For example, the location of the lane center line may be determined based on location information of one or more feature points on the lane center line, the location of the lane edge line may be determined based on location information of one or more feature points on the lane edge line, and the location of the lane stop line may be determined based on location information of one or more feature points on the lane stop line. The lane width may include a distance between two lane edge lines of the lane.

For example, the location of the lane center line is determined based on the location information of the feature point on the lane center line. When the lane center line includes two feature points, one of the feature points is located at one end of the lane without a stop line, and the other feature point is located on the lane stop line. The location of the lane center line may be determined based on location information of the two feature points. When the lane center line includes n feature points, and n is an odd number, a first feature point is located at one end of the lane without a stop line, an nth feature point is located on the lane stop line, and an $((n+1)/2)^{th}$ feature point is located at a center between two ends of the lane. The location of the lane center line is determined based on location information of at least two feature points in the n feature points. When the lane center line includes m feature points, and m is an even number, a first feature point is located at one end of the lane without a stop line, an $m^{th}$ feature point is located on the lane stop line, and an $(m/2)^{th}$ feature point is located at a center between two ends of the lane. The location of the lane center line is determined based on location information of at least two feature points in the m feature points.

For example, the V2X MAP information may include structure information of one or more lanes. Structure information of each lane may include information, for example, a lane attribute, a lane location, or a lane width of the lane, may further include information, for example, a lane attribute, a lane location, or a lane width of a lane adjacent to the lane, and may further include information, for example, a lane attribute, a lane location, or a lane width of each lane in a link including the lane.

For example, the V2X MAP information may include lane ID information corresponding to the structure information of each lane. For example, the V2X MAP information may include a laneID field, and the laneID field indicates the lane ID information.

For example, the V2X MAP information may include one or more fields shown in FIG. 1, and indicates structure information of a road. For example, the V2X MAP information may include a lanes field, and the lanes field indicates the structure information of the lane. The lanes field may include one or more fields in the information sequence Seq.of Lane in FIG. 1. For example, the V2X MAP information may include one or more of the laneWidth field, the laneAttributes field, the connectsTo field, the points field, the laneID field, the upstreamnodeID field, and the like in the Seq.of Lane. For meanings of the fields, refer to the foregoing related descriptions. The on-board unit obtains the structure information of the road based on the lanes field.

Figure 10:
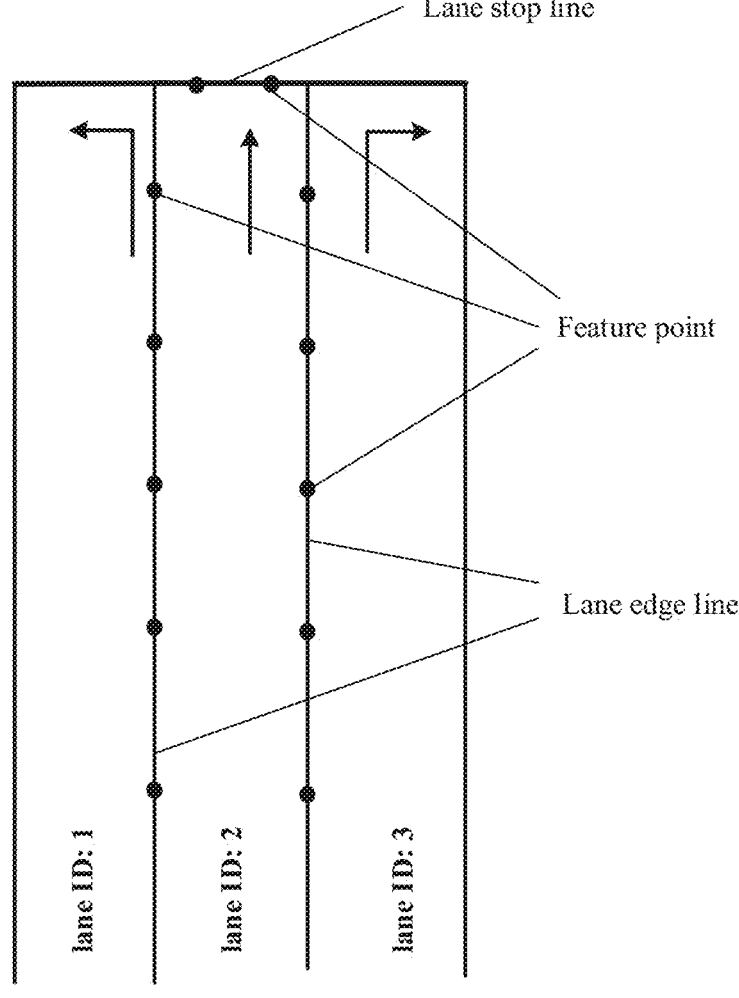
FIG. 10 is a schematic diagram of first structure information of a junction 30 according to an embodiment of the present disclosure.

For example, the V2X MAP information may include structure information of the lane on which the vehicle is located, that is, first structure information, and the ID information, of the first lane, corresponding to the first structure information. For example, for the junction 30 shown in FIG. 6, the first structure information may be structure information of the straight lane extending from south to north at the junction 30, and the lane ID that is 2 is the ID information of the first lane. The on-board unit may obtain a lane attribute of the lane corresponding to the lane ID that is 2 based on the laneAttributes field; may obtain a lane location of the lane corresponding to the lane ID that is 2 based on the points field, and may obtain lane locations of the lanes corresponding to the lane ID that is 1 and the lane ID that is 3; and may obtain a lane width of the lane corresponding to the lane ID that is 2 based on the laneWidth field. FIG. 10 is a schematic diagram of first structure information of a junction 30 according to an embodiment of the present disclosure. As shown in FIG. 10, the first structure information may include a location of a lane edge line of the straight lane extending from south to north (that is, the lane corresponding to the lane ID that is 2) at the junction 30, where the location of the lane edge line may be determined based on location information of a plurality of feature points on a lane edge line shown in FIG. 10; may further include a location of a lane stop line of the straight lane, where the location of the lane stop line may be determined based on location information of a plurality of feature points on a lane stop line shown in FIG. 10; and may further include a lane width of the straight lane and a lane attribute (not shown in the figure), for example, a curvature and an incline of the straight lane. For example, the first structure information may further include information, for example, about a location of a lane edge line and a location of a lane stop line that are of a right-side lane (that is, the lane corresponding to the lane ID that is 3) adjacent to the straight lane, and information, for example, about a location of a lane edge line and a location of a lane stop line that are of a left-side lane (that is, the lane corresponding to the lane ID that is 1) adjacent to the straight lane.

Step 903: Obtain perception data by using a perception device on the vehicle.

The perception device on the vehicle generates the perception data by detecting a surrounding environment of the vehicle. For the perception device, refer to related descriptions in step 703. The perception data may include a location of a lane line of one or more lanes in the link in which the vehicle is located, for example, may include a location of a lane edge line of the lane on which the vehicle is located and a location of a lane stop line of the lane on which the vehicle is located; and may further include a location of a lane edge line and a location of a lane stop line that are of a lane adjacent to the lane on which the vehicle is located, and the like.

It can be understood that the perception device may detect a location of the lane line relative to the vehicle, to determine a location of the detected lane line based on the location of the vehicle. For example, the location of the vehicle may be determined by using one or more of an inertial measurement unit (Inertial Measurement Unit, IMU), vehicle traveling information (for example, a wheel speed, a mileage, a vehicle steering angle, and a gear), an on-board camera, a lidar, and the like with reference to an RTK positioning result.

For example, the on-board unit may obtain more accurate perception data with reference to a map. For example, the on-board unit may match the detected lane line with data on the map, to determine a location of the detected lane line and the location of the vehicle, thereby improving precision of the location of the lane line and the location of the vehicle.

Step 904: Obtain second structure information of the road based on the perception data.

The on-board unit obtains, based on the perception data, the structure information of the lane on which the vehicle is located, that is, the second structure information. For example, the second structure information may include lane information, for example, a lane attribute, a lane location, or a lane width of the lane on which the vehicle is located, may further include information, for example, a lane attribute, a lane location, or a lane width of an adjacent lane, and may further include information, for example, a lane attribute, a lane location, or a lane width of each lane in a link in which the vehicle is located.

Figure 11:
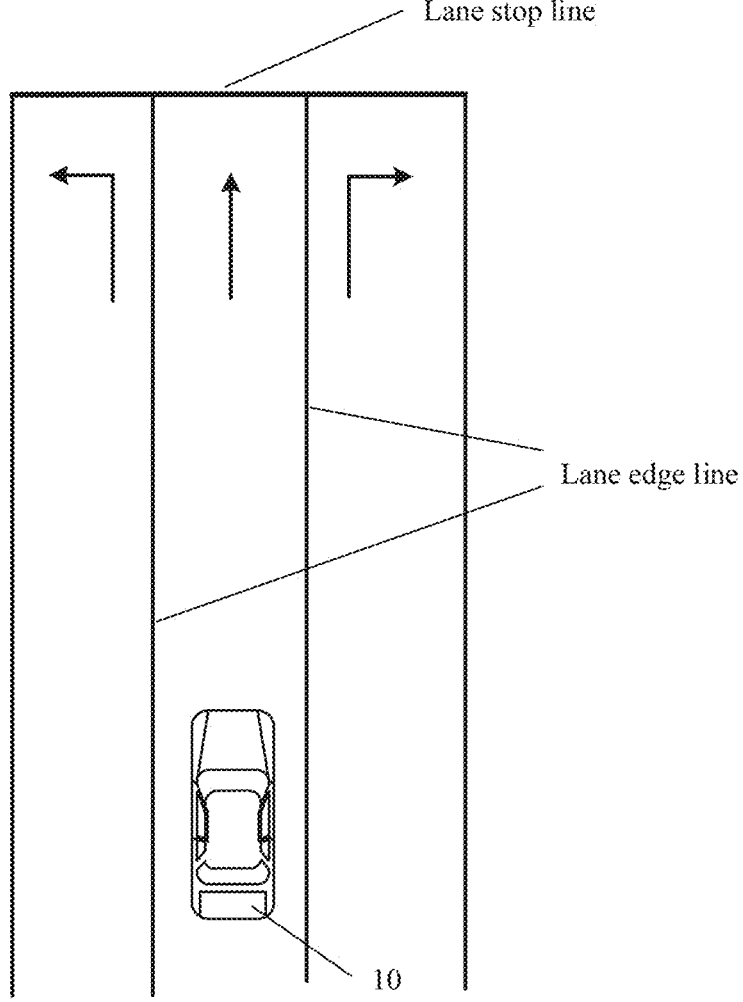
FIG. 11 is a schematic diagram of second structure information of a junction 30 according to an embodiment of the present disclosure.

For example, the vehicle 10 is located on the straight lane extending from south to north at the junction 30 shown in FIG. 6. The on-board unit obtains the second structure information based on the perception data. FIG. 11 is a schematic diagram of the second structure information of the junction 30 according to an embodiment of the present disclosure. As shown in FIG. 11, the second structure information may include the location of the lane edge line and a location of a lane stop line that are of the straight lane extending from south to north at the junction 30, and may further include a lane width, a lane attribute (not shown in the figure), for example, a curvature and an incline of the straight lane. The lane width and the lane attribute may be determined based on locations of two lane edge lines of the straight lane. The information, for example, about the location of the lane edge line, a lane width, or a lane attribute of the right-side lane adjacent to the straight lane, and information, for example, about the location of the lane edge line, a lane width, or a lane attribute of the left-side lane adjacent to the straight lane may be further included.

For example, the map includes a rich source of road information, and the on-board unit may obtain the second structure information of the road based on the perception data and the map. For example, the on-board unit may obtain, based on the location of the vehicle, on the map, the information, for example, the lane location, the lane width, or the lane attribute of the lane on which the vehicle is located, may further obtain the information, for example, the lane location, the lane width, or the lane attribute of the adjacent lane, and may further obtain the information, for example, the lane attribute, the lane location, or the lane width of each lane in the link including the lane; and may further obtain the second structure information based on the obtained information and the perception data, thereby improving precision of the second structure information.

Step 905: Determine that the vehicle is located on a first lane by matching the first structure information with the second structure information.

In a possible implementation, the first structure information may be matched with the second structure information, and it is determined, based on a matching result, that the first structure information and the second structure information belong to a same lane. Further, the ID information of the first lane may be obtained based on the first structure information; and the first lane may be determined based on the ID information of the first lane.

For example, when the first structure information and the second structure information satisfy a preset condition, it may be determined that the first structure information and the second structure information belong to the same lane. The preset condition may include that a quantity of lanes included in the first structure information is the same as a quantity of lanes included in the second structure information, may further include that lane location deviations of corresponding lanes in the first structure information and the second structure information are within a preset range, and may further include that a lane location deviation of each lane in the first structure information is the same as a lane location deviation of a corresponding lane in the second structure information, and may further include that lane attributes of corresponding lanes in the first structure information and the second structure information are the same, and that lane widths of the corresponding lanes in the first structure information and the second structure information are the same. For example, the first structure information shown in FIG. 10 may be matched with the second structure information shown in FIG. 11. For example, there are three lanes in FIG. 10, and there are also three lanes in FIG. 11. A value of a deviation between a location of a lane edge line of each lane in FIG. 10 and a location of a lane edge line of a corresponding lane in FIG. 11 may be calculated. The value of the deviation is within a preset range, and deviation values corresponding to the lanes are the same. A lane attribute of each lane in FIG. 10 may be further compared with a lane attribute of each lane in FIG. 11. If the lane attributes are the same, it may be determined that both the first structure information and the second structure information belong to the same lane, that is, the lane on which the vehicle 10 is located.

Further, the ID information of the first lane that is in the V2X MAP information and that corresponds to the first structure information may be obtained, and it is determined that the vehicle is located on the first lane corresponding to the ID information of the first lane, to accurately locate the lane on which the vehicle is located. For example, the ID information, of the first lane, corresponding to the first structure information in FIG. 10 is the lane ID that is 2, so that it is determined that the vehicle 10 is located on the straight lane, corresponding to the lane ID that is 2, extending from south to north at the junction 30.

In this embodiment of the present disclosure, the first structure information of the road is obtained based on the V2X MAP information; the second structure information of the road is obtained based on the perception data; and it is determined, by matching the first structure information with the second structure information, that the vehicle is located on the first lane. In this manner, there is no dependence on precision of localization coordinate information (for example, latitude and longitude information in GNSS signal-based localization), and accuracy of lane localization and applicability of the method are improved.

Further, the V2X MAP information further indicates traffic information corresponding to ID information of each lane. After it is determined that the vehicle is located on the first lane, traffic information corresponding to the ID information of the first lane may be extracted from the V2X MAP. For a detailed process of obtaining the traffic information, refer to related descriptions in FIG. 7.

An example in which traffic signal light status information is obtained is used for description below.

FIG. 12 is a flowchart of another method for obtaining traffic information according to an embodiment of the present disclosure. The method may be performed by an on-board unit. As shown in FIG. 12, the method may include the following steps.

Step 1201: Receive V2X MAP information from a road side device.

For example, the V2X MAP information further indicates a correspondence between ID information of a plurality of lanes and ID information of a plurality of phases. The plurality of lanes include the first lane, the ID information of the plurality of lanes includes ID information of the first lane, and the ID information of the plurality of phases includes ID information of a first phase.

For example, the V2X MAP information may include a laneID field, a phaseID field, and a connectsTo field. For meanings of the fields, refer to the foregoing related descriptions. The laneID field indicates the ID information of the plurality of lanes, the phaseID field indicates the ID information of the plurality of phases, and the connectsTo field indicates the correspondence between the ID information of the plurality of lanes and the ID information of the plurality of phases, that is, a correspondence between different values of the laneID field and different values of the phaseID field. For example, as shown in FIG. 6, for the link extending from south to north at the junction 30, the left-turn lane with the lane ID that is 1 corresponds to the phase ID that is 1, the straight lane with the lane ID that is 2 corresponds to the phase ID that is 2, and the right-turn lane with the lane ID that is 3 corresponds to the phase ID that is 3.

Step 1202: Obtain first structure information of a road based on the V2X MAP information.

Step 1203: Obtain perception data by using a perception device on a vehicle.

Step 1204: Obtain second structure information of the road based on the perception data.

Step 1205: Determine that the vehicle is located on a first lane by matching the first structure information with the second structure information.

For detailed descriptions of step 1201 to step 1205, refer to step 901 to step 905.

Step 1206: Receive a V2X SPAT message from the road side device.

It can be understood that step 1206 may alternatively be performed before any one of step 1201 to step 1205.

The V2X SPAT message includes the ID information of the plurality of phases and traffic signal light status information corresponding to ID information of each phase. For related descriptions of the traffic signal light status information, refer to the foregoing descriptions.

For example, the V2X SPAT message may include a phaseID field and a phaseStates field. For meanings of the fields, refer to the foregoing related descriptions. The phaseID field is the same as the phaseID field in the V2X MAP information, and indicates the ID information of the plurality of phases. For example, the V2X SPAT message may include the ID information of the first phase and traffic signal light status information corresponding to the ID information of the first phase, for example, may include information, for example, about a light color corresponding to the phase ID that is 2 in FIG. 6 and remaining time of the light color.

Step 1207: Determine the ID information of the first lane, corresponding to the first lane, in the V2X MAP information.

The ID information of the first lane corresponding to the first lane is the ID information, of the first lane, that is in the V2X MAP information and that corresponds to the first structure information. For example, if the ID information of the first lane corresponding to the first structure information in FIG. 10 is the lane ID that is 2, it may be determined that the ID information, of the first lane, corresponding to the first lane is the lane ID that is 2.

Step 1208: Determine the first phase information based on the correspondence and the ID information of the first lane.

The on-board unit may determine the first phase information corresponding to the ID information of the first lane based on the correspondence, indicated in the V2X MAP information, between the ID information of the plurality of lanes and the ID information of the plurality of phases. It can be understood that, when the ID information of the first lane corresponds to a plurality of pieces of phase information, the on-board unit may use, based on an expected turning behavior of the vehicle, phase information corresponding to the turning behavior as the first phase information. For example, the ID information of the first lane in FIG. 10 is the lane ID that is 2. Based on the correspondence between a lane ID and a phase ID shown in FIG. 6, the straight lane with the lane ID that is 2 corresponds to the phase ID that is 2, and it may be determined that the ID information of the first lane is the phase ID that is 2.

Step 1209: Extract traffic signal light status information corresponding to the ID information of the first phase from the V2X SPAT message.

For example, the on-board unit may extract information, for example, a light color corresponding to a phase ID and remaining time of the light color based on the phaseStates field, for example, may extract information, for example, a light color corresponding to the lane ID that is 2 in FIG. 6 and remaining time of the light color.

In this embodiment of the present disclosure, the first structure information of the road is obtained based on the V2X MAP information; the second structure information of the road is obtained based on the perception data; and it is determined, by matching the first structure information with the second structure information, that the vehicle is located on the first lane. In this way, the ID information, of the first lane, corresponding to the first lane is further determined, and the traffic signal light status information corresponding to the ID information of the first phase is extracted based on the V2X SPAT message. In this manner, there is no dependence on precision of localization coordinate information, and accuracy of lane localization and applicability of the method are improved, thereby ensuring that accurate traffic signal light status information is obtained, and improving driving safety.

FIG. 13 is a flowchart of another method for obtaining traffic information according to an embodiment of the present disclosure. The method may be performed by an on-board unit. As shown in FIG. 13, the method may include the following steps.

Step 1301: Receive V2X MAP information from a road side device.

For example, an on-board unit may receive the V2X MAP information broadcast by a road side unit (deployed in the road side device); or an on-board unit may actively request a road side unit to provide the V2X MAP information. For example, the on-board unit may be the on-board unit deployed on the vehicle 10 shown in FIG. 4. The road side unit may be the road side unit deployed at the junction 30. When the vehicle 10 travels near the junction 30, the on-board unit may receive the V2X MAP information sent by the road side unit.

The V2X MAP information indicates location information of a plurality of mark points on a road. The plurality of mark points may include a first mark point, and the location information of the plurality of mark points includes first location information of the first mark point. A mark point may be a predefined point on the road, for example, may be a feature point on a lane center line, a lane edge line, or a lane stop line, or may be an intersection point of a lane edge line and a lane stop line.

For example, some feature points on the road may be pre-selected as the plurality of mark points. For example, some feature points in a link or some feature points on one or more lanes in the link may be selected as the plurality of mark points on the road. For example, a quantity of mark points included in the plurality of mark points may depend on a length and/or curvature of the road. For example, when the road is a straight road (that is, with a curvature of 0) or the road is relatively short, a small quantity of feature points may be selected as the plurality of mark points, thereby improving data processing efficiency; or when the road is a bend (that is, with a curvature that is not 0) or the road is relatively long, a small quantity of feature points may be selected as the plurality of mark points, to fully reflect a feature of a road environment.

For example, the V2X MAP information may further include lane ID information corresponding to each lane on the road. For example, the V2X MAP information may include a laneID field, and the laneID field indicates the lane ID information.

Figure 14:
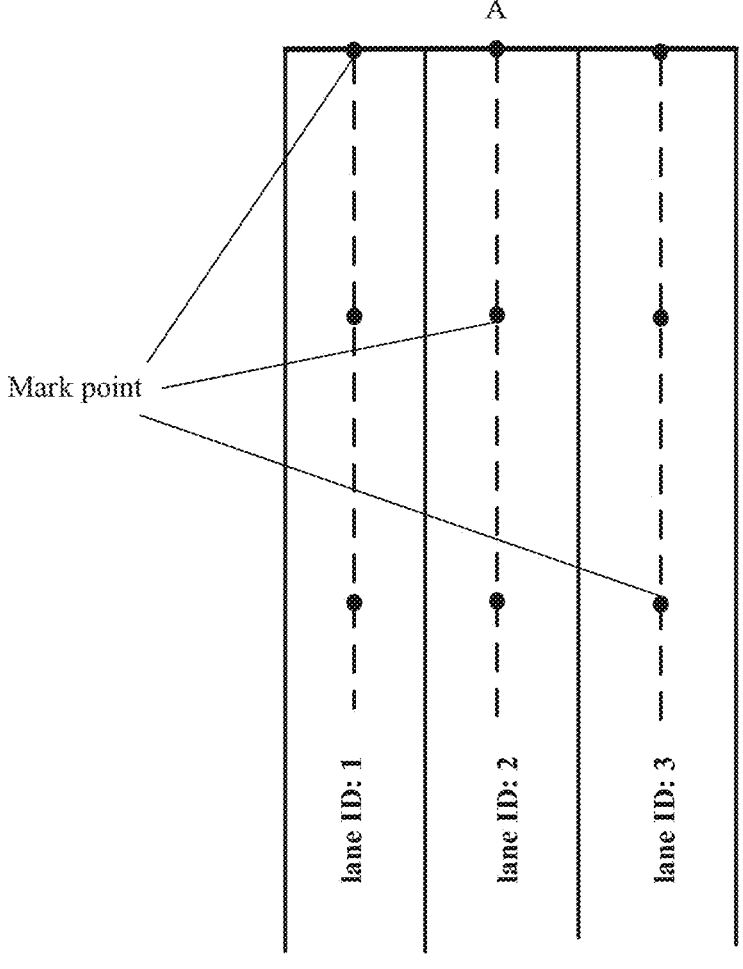
FIG. 14 is a schematic diagram of location information, indicated by V2X MAP information, of a plurality of mark points according to an embodiment of the present disclosure.

For example, FIG. 14 is a schematic diagram of the location information, indicated by V2X MAP information, of the plurality of mark points according to an embodiment of the present disclosure. As shown in FIG. 14, some feature points on a lane center line and a lane stop line in the link extending from south to north at the junction 30 in FIG. 4 may be selected as the plurality of mark points, and location information of each of the mark points is location information of a corresponding feature point. An intersection point A of the lane center line and the lane stop line that are of the lane with the lane ID that is 2 is the first mark point.

Step 1302: Obtain perception data by using a perception device on the vehicle.

For this step, refer to related descriptions in step 903.

Step 1303: Obtain second location information of the first mark point based on the perception data.

Figure 15:
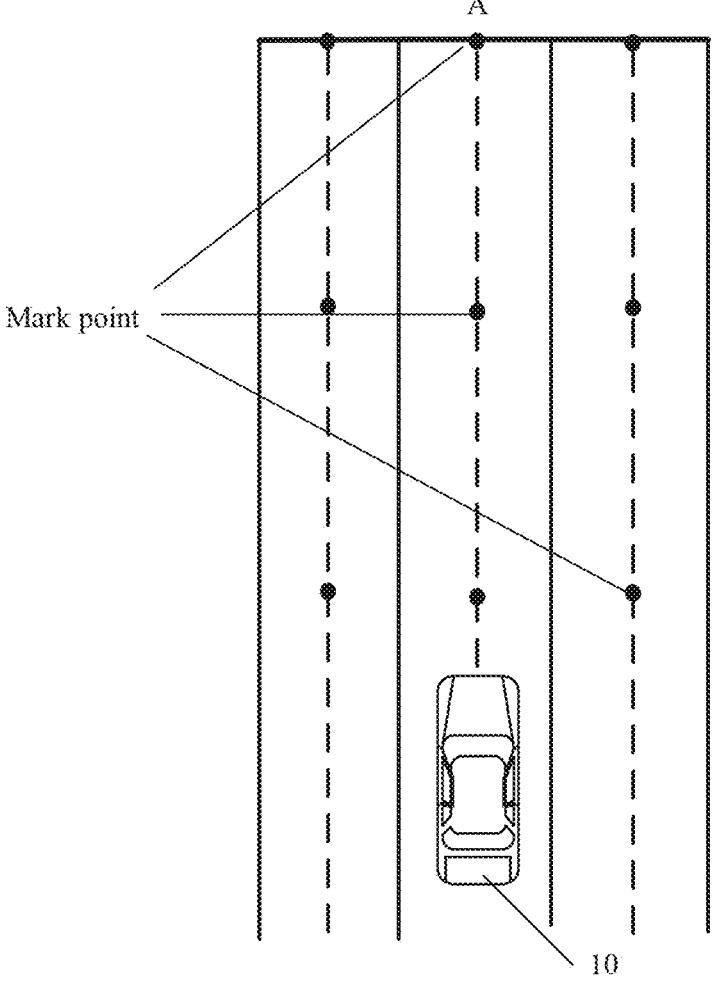
FIG. 15 is a schematic diagram of location information of a plurality of obtained mark points according to an embodiment of the present disclosure.

The perception data may include location information of a lane line (for example, a lane edge line, a lane stop line, or a lane center line) of a lane and the like. Further, the second location information of the first mark point may be determined based on a location of the first mark point on the lane line. For example, FIG. 15 is a schematic diagram of the obtained location information of the plurality of mark points according to an embodiment of the present disclosure. As shown in FIG. 15, the first mark point A is an intersection point of a lane center line and a lane stop line that are of a lane on which a vehicle 10 is located. The location information of the first mark point A, that is, the second location information, may be determined based on vehicle localization information based on the lane stop line photographed by an on-board camera. For example, the on-board unit may obtain the vehicle localization information by using a GNSS receiver on a vehicle. The GNSS receiver may be a GPS receiver, a BeiDou system receiver, or a receiver in another satellite positioning system.

For example, the on-board unit may determine the second location information of the first mark point based on the perception data and map data. For example, the perception data may be matched with the map data, to obtain location information on the map, that is, the second location information, corresponding to the first mark point A, thereby further improving precision of the obtained second location information.

Step 1304: Determine a value of a deviation between the first location information and the second location information.

The value of the deviation is a value of a deviation corresponding to the first mark point. The first location information indicates a location, corresponding to the first mark point, in the V2X MAP information, and the second location information is a location of the first mark point that is located by using a GNSS receiver or a map. For example, a value of a deviation between location information of the point A in FIG. 14 and location information of the point A in FIG. 15 may be determined.

As in localization by using the GNSS receiver, a ground GNSS receiver is used to receive a signal from a satellite, to calculate pseudoranges between the GNSS receiver and a plurality of satellites at a same moment, a space resection method is used to determine coordinate information for the localization. There is a localization deviation because of an effect of a GNSS satellite, a satellite signal propagation process, or the ground GNSS receiver. Therefore, there is a deviation between the second location information determined based on the vehicle localization information and an actual location information of the first mark point. Similarly, as a location of each point on a map is usually determined based on a GNSS signal when a V2X MAP is drawn, there is also a deviation between the first location information in the V2X MAP information and the actual location information of the first mark point. Therefore, a value of a deviation between the first location information and the second location information may indicate a relative deviation between a location provided by a GNSS receiver on the vehicle and a location in the corresponding V2X MAP information. For example, the location in the V2X MAP information and the location provided by the GNSS receiver on the vehicle correspond to a same coordinate system.

Similarly, as a location of each point on a map is usually determined based on a GNSS signal when a map is drawn, there is also a deviation between the second location information determined based on the map data and the actual location information of the first mark point. Therefore, the value of the deviation between the first location information and the second location information may indicate a relative deviation between the location on the map and the location in the corresponding V2X MAP information. For example, the location in the V2X MAP information and the location on the map correspond to a same coordinate system.

For example, for the plurality of mark points in step 1301, a value of a deviation corresponding to each of the mark points may be obtained by performing steps 1302 to 1304, thereby ensuring that a valid value of a deviation can be obtained in a plurality of road environments. For example, an average of deviation values corresponding to a plurality of mark points near the first mark point may be further calculated, and the average is used as a value of a deviation corresponding to the first mark point.

Step 1305: Obtain localization information of the vehicle.

The localization information may include localization information determined by using the GNSS receiver, and may further include localization information determined based on the map data.

Step 1306: Correct the localization information based on the value of the deviation, and determine that the vehicle is located on a first lane.

The on-board unit may correct the localization information of the vehicle based on the value of the deviation corresponding to the first mark point, determine the location information corresponding to the vehicle in the V2X MAP information, and may determine, based on location information, of each lane, indicated by the V2X MAP information, the first lane on which the vehicle is located. For example, localization information of the vehicle 10 in FIG. 15 is corrected based on the value of the deviation corresponding to the point A, and it is determined that a lane corresponding to the corrected localization information in the V2X MAP information is a lane with the lane ID is 2, to determine that the vehicle is located on the lane corresponding to the lane ID that is 2.

Because factors such as a GNSS satellite, a satellite signal propagation process, or a ground GNSS receiver within a specific area (for example, within thousands of meters) are similar, corresponding localization deviation values of points within the area may be considered as the same. Therefore, localization information of a point within the area may be corrected based on a value of a deviation corresponding to any other point within the area, to remove a relative deviation between the location provided by the GNSS receiver on the vehicle or based on the map data and the location in the corresponding V2X MAP information. For example, a distance between the first mark point and the vehicle may be within a preset range. For example, the preset range may be thousands of meters. The vehicle localization information determined by the GNSS receiver on the vehicle or based on the map data is corrected based on the value of the deviation corresponding to the first mark point, so that the relative deviation between the location provided by the GNSS receiver on the vehicle or based on the map data and the location in the corresponding V2X MAP information is removed, thereby more accurately determining, based on the corrected vehicle localization information, the lane on which the vehicle is located, and improving accuracy of lane localization.

In this embodiment of the present disclosure, the second location information of the first mark point is obtained based on the perception data. The value of the deviation, indicated by the V2X MAP information, between the first location information and the second location information that are of the first mark point is determined; and the localization information of the vehicle is corrected based on the value of the deviation, to determine that the vehicle is on the first lane. In this manner, there is no dependence on precision of vehicle localization information (for example, latitude and longitude information in GNSS signal-based localization), and accuracy of lane localization and applicability of the method are improved.

Further, the V2X MAP information further indicates traffic information corresponding to ID information of each lane. After it is determined that the vehicle is located on the first lane, traffic information corresponding to the ID information of the first lane may be extracted from the V2X MAP. For a detailed process of obtaining the traffic information, refer to related descriptions in FIG. 7.

An example in which traffic signal light status information is obtained is used for description below.

FIG. 16 is a flowchart of another method for obtaining traffic information according to an embodiment of the present disclosure. The method may be performed by an on-board unit. As shown in FIG. 16, the method may include the following steps.

Step 1601: Receive V2X MAP information from a road side device.

For example, the V2X MAP information indicates a correspondence between ID information of a plurality of lanes and ID information of a plurality of phases. The plurality of lanes include a first lane, the ID information of the plurality of lanes includes ID information of the first lane, and the ID information of the plurality of phases includes ID information of a first phase.

Step 1602: Obtain perception data by using a perception device on a vehicle.

Step 1603: Obtain second location information of a first mark point based on the perception data.

Step 1604: Determine a value of a deviation between first location information and the second location information.

Step 1605: Obtain localization information of the vehicle.

Step 1606: Correct the localization information based on the value of the deviation, and determine that the vehicle is located on the first lane.

For detailed descriptions of step 1601 to step 1606, refer to step 1301 to step 1306.

Step 1607: Receive a V2X SPAT message from the road side device, where the V2X SPAT message includes the ID information of the first phase and traffic signal light status information corresponding to the ID information of the first phase.

Step 1608: Determine the ID information of the first lane, corresponding to the first lane, in the V2X MAP information.

Step 1609: Determine the ID information of the first phase based on the correspondence and the ID information of the first lane.

Step 1610: Extract the traffic signal light status information corresponding to the ID information of the first phase from the V2X SPAT message.

For detailed descriptions of step 1607 to step 1610, refer to step 1206 to step 1209.

In this embodiment of the present disclosure, the second location information of the first mark point is obtained based on the perception data; the value of the deviation, indicated by the V2X MAP information, between the first location information and the second location information that are of the first mark point is determined; and the localization information of the vehicle is corrected based on the value of the deviation, to determine that the vehicle is on the first lane, so that the ID information, of the first lane, corresponding to the first lane is further determined, and the traffic signal light status information corresponding to the ID information of the first phase is extracted based on the V2X SPAT message. In this manner, there is no dependence on precision of vehicle localization information, and accuracy of lane localization and applicability of the method are improved, thereby ensuring to obtain accurate traffic signal light status information, and improving driving safety.

Based on a same concept as that in the foregoing method embodiments, an embodiment of the present disclosure further provides an apparatus for obtaining traffic information. The apparatus for obtaining traffic information is configured to perform the technical solutions described in the foregoing method embodiments. For example, the steps shown in FIG. 7 may be performed.

Figures 17, 18:
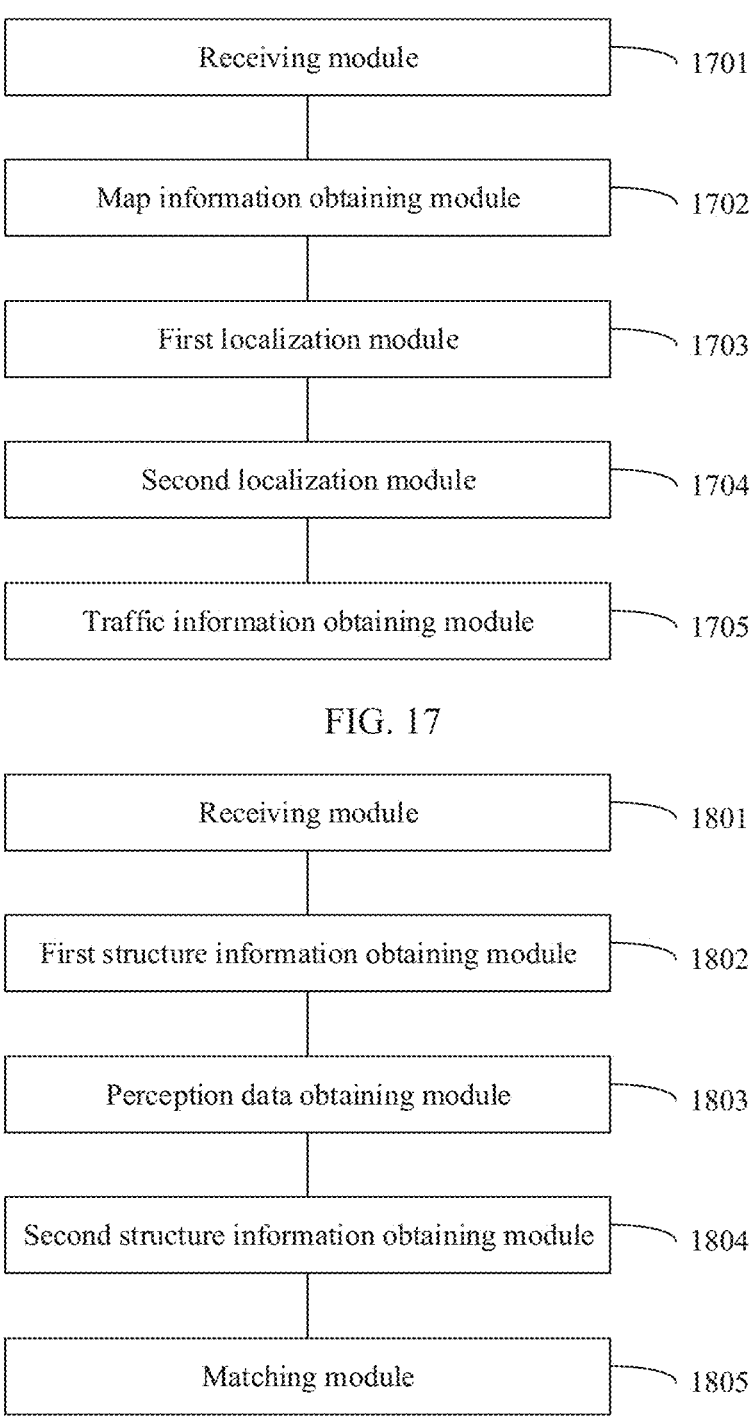
FIG. 17 is a schematic diagram of a structure of an apparatus for obtaining traffic information according to an embodiment of the present disclosure.
FIG. 18 is a schematic diagram of a structure of a localization apparatus according to an embodiment of the present disclosure.

FIG. 17 is a schematic diagram of a structure of an apparatus for obtaining traffic information according to an embodiment of the present disclosure. As shown in FIG. 17, the apparatus may include: a receiving module 1701 configured to receive V2X information, where the V2X information indicates a first group of lane identifiers and traffic information corresponding to each lane ID in the first group of lane identifiers, and the first group of lane identifiers includes a first lane identifier; a map information obtaining module 1702 configured to obtain map information, where the map information indicates that a second lane ID on a map and the first lane ID correspond to a same lane; a first localization module 1703 configured to determine that a vehicle is on the lane corresponding to the second lane identifier; a second localization module 1704 configured to determine, based on the map information, that the vehicle is on the lane corresponding to the first lane identifier; and a traffic information obtaining module 1705 configured to extract traffic information corresponding to the first lane ID from the V2X information.

In a possible implementation, the V2X information includes V2X MAP information. The V2X MAP information includes a lane ID laneID field, and the laneID field indicates the first group of lane identifiers.

In a possible implementation, the V2X information includes a V2X SPAT message, the V2X SPAT message includes a phase ID PhaseID field, and the PhaseID field indicates the first group of lane identifiers.

In a possible implementation, the V2X MAP information further includes one or more of a laneWidth field, a lane-Attributes field, a maneuvers field, a connectsTo field, a points field, a speedLimits field, and a link Width field.

In a possible implementation, the V2X SPAT message further includes a phaseStates field.

In the foregoing embodiment, for technical effects and detailed descriptions of the apparatus for obtaining traffic information and the possible implementations thereof, refer to the foregoing method for obtaining traffic information.

Based on a same concept as that in the foregoing method embodiments, an embodiment of the present disclosure further provides a localization apparatus. The apparatus for obtaining traffic information is configured to perform the technical solutions described in the foregoing method embodiments. For example, the steps shown in FIG. 9 or FIG. 12 may be performed.

FIG. 18 is a schematic diagram of a structure of a localization apparatus according to an embodiment of the present disclosure. As shown in FIG. 18, the apparatus may include: a receiving module 1801 configured to receive V2X MAP information from a road side device; a first structure information obtaining module 1802 configured to obtain first structure information of a road based on the V2X MAP information; a perception data obtaining module 1803 configured to obtain perception data by using a perception device on a vehicle; a second structure information obtaining module 1804 configured to obtain second structure information of the road based on the perception data; and a matching module 1805 configured to determine, by matching the first structure information with the second structure information, that the vehicle is on a first lane.

In a possible implementation, the V2X MAP information includes the first structure information and ID information, of the first lane, corresponding to the first structure information; and the matching module is further configured to: determine, based on a matching result, that the first structure information and the second structure information belong to a same lane; obtain the ID information of the first lane based on the first structure information; and determine the first lane based on the ID information of the first lane.

In a possible implementation, the V2X MAP information indicates a correspondence between ID information of a plurality of lanes and ID information of a plurality of phases, the plurality of lanes include the first lane, the ID information of the plurality of lanes includes ID information of the first lane, and the ID information of the plurality of phases includes ID information of a first phase; and the apparatus further includes a traffic signal light status information obtaining module configured to: receive a V2X SPAT message from the road side device, where the V2X SPAT message includes the ID information of the first phase and traffic signal light status information corresponding to the ID information of the first phase; determine the ID information of the first lane, corresponding to the first lane, in the V2X MAP information; determine the ID information of the first phase based on the correspondence and the ID information of the first lane; and extract the traffic signal light status information corresponding to the ID information of the first phase from the V2X SPAT message.

In a possible implementation, the structure information indicates one or more of a lane attribute, a lane location, and a lane width.

In a possible implementation, the V2X MAP information includes a lanes field, and the lanes field indicates the first structure information.

In a possible implementation, the second structure information obtaining module is further configured to obtain the second structure information of the road based on the perception data and a map.

In the foregoing embodiment, for technical effects and detailed descriptions of the localization apparatus and the possible implementations thereof, refer to the foregoing localization method.

Based on a same concept as that in the foregoing method embodiments, an embodiment of the present disclosure further provides another localization apparatus. The apparatus for obtaining traffic information is configured to perform the technical solutions described in the foregoing method embodiments. For example, the steps shown in FIG. 13 or FIG. 16 may be performed.

Figure 19:
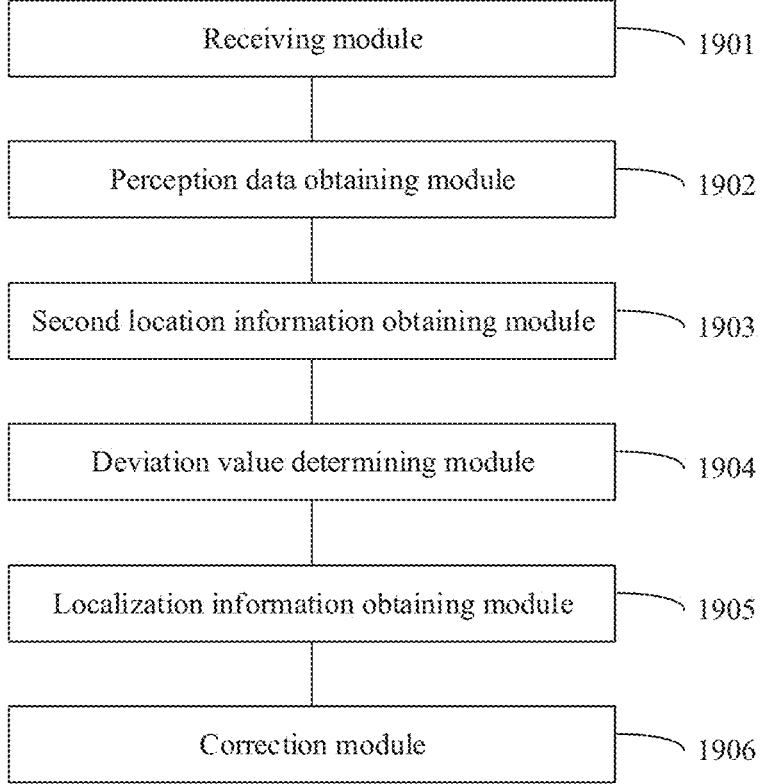
FIG. 19 is a schematic diagram of a structure of another localization apparatus according to an embodiment of the present disclosure.

FIG. 19 is a schematic diagram of a structure of another localization apparatus according to an embodiment of the present disclosure. As shown in FIG. 19, the apparatus may include: a receiving module 1901 configured to receive V2X MAP information from a road side device, where the V2X MAP information indicates location information of a plurality of mark points on a road, the plurality of mark points include a first mark point, and the location information of the plurality of mark points includes first location information of the first mark point; a perception data obtaining module 1902 configured to obtain perception data by using a perception device on a vehicle; a second location information obtaining module 1903 configured to obtain second location information of the first mark point based on the perception data; a deviation value determining module 1904 configured to determine a value of a deviation between the first location information and the second location information; a localization information obtaining module 1905 configured to obtain localization information of the vehicle; and a correction module 1906 configured to: correct the localization information based on the value of the deviation, and determine that the vehicle is on a first lane.

In a possible implementation, the V2X MAP information indicates a correspondence between ID information of a plurality of lanes and ID information of a plurality of phases, the plurality of lanes include the first lane, the ID information of the plurality of lanes includes ID information of the first lane, and the ID information of the plurality of phases includes ID information of a first phase; and the apparatus further includes a traffic signal light status information obtaining module configured to: receive a V2X SPAT message from the road side device, where the V2X SPAT message includes the ID information of the first phase and traffic signal light status information corresponding to the ID information of the first phase; determine the ID information of the first lane, corresponding to the first lane, in the V2X MAP information; determine the ID information of the first phase based on the correspondence and the ID information of the first lane; and extract the traffic signal light status information corresponding to the ID information of the first phase from the V2X SPAT message.

In a possible implementation, a distance between the first mark point and the vehicle is within a preset range.

In a possible implementation, a quantity of mark points included in the plurality of mark points depends on a length and/or curvature of the road.

In a possible implementation, the perception data obtaining module is further configured to determine the second location information based on the perception data and map data.

In the foregoing embodiment, for technical effects and detailed descriptions of the localization apparatus and the possible implementations thereof, refer to the foregoing localization method.

It should be noted that, it should be understood that division into the modules of the foregoing apparatus for obtaining traffic information and the localization apparatus is merely logical function division. In actual implementation, all or some of the units may be integrated into one physical entity, or may be physically separated. All the modules may be implemented in a form of software invoked by a processing element, or may be implemented in a form of hardware. Alternatively, some of the modules may be implemented in a form of software invoked by a processing element, and some of the modules are implemented in a form of hardware.

An embodiment of the present disclosure provides a processing apparatus, including: a processor and a memory configured to store instructions that can be executed by the processor. The processor is configured to implement the method in the foregoing embodiment when executing the instructions. For example, the method shown in FIG. 7, FIG. 9, FIG. 12, FIG. 13, or FIG. 16 may be performed.

A type of the processing apparatus is not limited in embodiments of the present disclosure. The processing apparatus may be implemented by hardware, software, or a combination of software and hardware.

For example, the processing apparatus may include a hardware module or a software module, for example, may include one or more modules described in FIG. 17, FIG. 18, or FIG. 19.

For example, the processing apparatus may be a vehicle, or a component having a data processing function in the vehicle, for example, an on-board terminal, an on-board controller, an on-board module, an on-board module set, an on-board component, an on-board chip, an on-board unit, or an on-board radar sensor.

For example, the processing apparatus may alternatively be another intelligent terminal, other than the vehicle, having the data processing capability, or a component or a chip disposed in the intelligent terminal. The intelligent terminal may be an intelligent transportation device, a smart household device, a robot, an unmanned aerial vehicle, or the like.

For example, the processing apparatus may be a general-purpose device or a dedicated device. In a specific implementation, the apparatus may further be a desktop computer, a portable computer, a network server, a personal digital assistant (PDA), a mobile phone, a tablet computer, a wireless terminal device, an embedded device or another device having the data processing function, or a component or a chip in the device.

For example, the processing apparatus may alternatively be a chip or processor having a processing function. The processing apparatus may include a plurality of processors. Each of the processors may be a single-core processor (single-central processing unit (CPU)), or may be a multi-core processor (multi-CPU).

Figure 20:
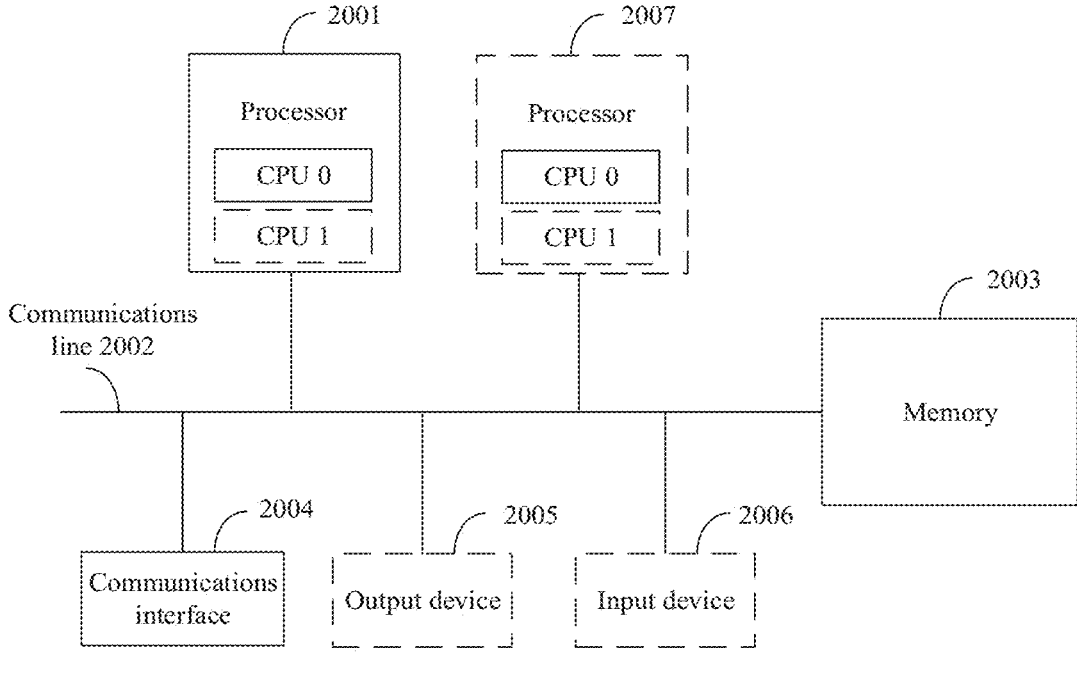
FIG. 20 is a schematic diagram of a structure of a processing apparatus according to an embodiment of the present disclosure.

FIG. 20 is a schematic diagram of a structure of a processing apparatus according to an embodiment of the present disclosure. As shown in FIG. 20, the processing apparatus may include a processor 2001, a communications line 2002, a memory 2003, and a communications interface 2004.

The processor 2001 may be a general-purpose CPU, a microprocessor, an application-specific integrated circuit (ASIC), or one or more integrated circuits for controlling program execution in the solutions of the present disclosure.

The communications line 2002 may include a path for transmitting information between the foregoing components.

The communications interface 2004 uses any apparatus, for example, a transceiver, and is configured to communicate with another device or a communications network, for example, the Ethernet, a radio access network (RAN), or a wireless local area network (WLAN). For example, in an example, the communications interface 2004 may be used for communication with an on-board sensor or the like, to obtain perception data. In another example, the communications interface 2004 may be used for communication with a road side device, to receive a V2I SPAT message or V2I MAP information.

The memory 2003 may be, but is not limited to, a read-only memory (ROM) or another type of static storage device that can store static information and instructions, a random-access memory (RAM) or another type of dynamic storage device that can store information and instructions; or may be an electrically erasable programmable ROM (EE-PROM), a compact disc ROM (CD-ROM) or another compact disc storage, an optical disc storage (including a compact disc, a laser disc, an optical disc, a digital versatile disc, a BLU-RAY® disc, and the like), a magnetic disk storage medium or another magnetic storage device, or any other medium that can carry or store expected program code in a form of an instruction or a data structure and that can be accessed by a computer. The memory may be independent, and is connected to the processor through the communications line 2002. Alternatively, the memory may be integrated with the processor. Usually, the memory provided in this embodiment of the present disclosure may be non-volatile. The memory 2003 is configured to store computer-executable instructions for performing the solutions in the present disclosure, and the processor 2001 controls the execution. The processor 2001 is configured to execute the computer-executable instructions stored in the memory 2003, to implement the method provided in the foregoing embodiment of the present disclosure. For example, a corresponding procedure in the method shown in FIG. 7, FIG. 9, FIG. 12, FIG. 13, or FIG. 16 may be performed.

In some embodiments, the computer-executable instructions in this embodiment of the present disclosure may also be referred to as application program code. This is not limited in this embodiment of the present disclosure.

In a specific implementation, in an embodiment, the processor 2001 may include one or more CPUs, for example, a CPU 0 and a CPU 1 in FIG. 20.

In a specific implementation, in an embodiment, the processing apparatus may include a plurality of processors, for example, the processor 2001 and a processor 2007 in FIG. 20. Each of the processors may be a single-core (single-CPU) processor, or may be a multi-core (multi-CPU) processor. The processor herein may be one or more devices, circuits, and/or processing cores for processing data (for example, a computer program instruction).

In a specific implementation, in an embodiment, the processing apparatus may further include an output device 2005 and an input device 2006. The output device 2005 communicates with the processor 2001, and may display information in a plurality of manners. For example, the output device 2005 may be a liquid crystal display (LCD), a light-emitting diode (LED) display device, a cathode ray tube (CRT) display device, a projector, or the like. When communicating with the processor 2001, the input device 2006 may receive a user input in a plurality of manners. For example, the input device 2006 may be a mouse, a keyboard, a touchscreen device, or a sensing device.

In an example, with reference to the processing apparatus shown in FIG. 20, the receiving module 1701 and the map information obtaining module 1702 in FIG. 17 may be implemented by the communications interface 2004 in FIG. 20, and the first localization module 1703, the second localization module 1704, and the traffic information obtaining module 1705 in FIG. 17 may be implemented by the processor 2001 in FIG. 20.

In another example, with reference to the processing apparatus shown in FIG. 20, the receiving module 1801 and the perception data obtaining module 1803 in FIG. 18 may be implemented by the communications interface 2004 in FIG. 20, and the first structure information obtaining module 1802, the second structure information obtaining module 1804, and the matching module 1805 in FIG. 18 may be implemented by the processor 2001 in FIG. 20.

In another example, with reference to the processing apparatus shown in FIG. 20, the receiving module 1901 and the perception data obtaining module 1902 in FIG. 19 may be implemented by the communications interface 2004 in FIG. 20, and the second location information obtaining module 1903, the deviation value determining module 1904, the localization information obtaining module 1905, and the correction module 1906 in FIG. 19 may be implemented by the processor 2001 in FIG. 20.

An embodiment of the present disclosure provides a non-volatile computer-readable storage medium, storing computer program instructions. When the computer program instructions are executed by a processor, the foregoing method is implemented. For example, the method shown in FIG. 7, FIG. 9, FIG. 12, FIG. 13, or FIG. 16 may be performed.

An embodiment of the present disclosure provides a computer program product, including computer-readable code, or a non-volatile computer-readable storage medium carrying computer-readable code. When the computer-readable code is run by a processor of a processing apparatus, the processor of the processing apparatus performs the foregoing method. For example, the method shown in FIG. 7, FIG. 9, FIG. 12, FIG. 13, or FIG. 16 may be performed.

The computer-readable storage medium may be a tangible device that can retain and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include a portable computer disk, a hard disk, a RAM, a ROM, an electrically programmable ROM (EPROM), or flash memory, a static RAM (SRAM), a portable CD-ROM, a digital video disk (DVD), a memory stick, a floppy disk, a mechanical coding device, for example, a punched card or a protrusion structure in a groove that stores instructions, and any suitable combination thereof.

The computer-readable program instructions or code described herein may be downloaded from the computer-readable storage medium to each computing/processing device, or may be downloaded from a network, for example, the Internet, a local area network (LAN), a wide area network (WAN), and/or a wireless network to an external computer or an external storage device. The network may include a copper transmission cable, optical fiber transmission, wireless transmission, a path, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions for performing operations in the present disclosure may be assembly instructions, instruction set architecture (ISA) instructions, machine instructions, machine-related instructions, microcode, firmware instructions, status setting data, or source code or target code written in any combination of one or more programming languages. The programming language includes an object-oriented programming language, for example, Smalltalk and C++, and a conventional procedural programming language, for example, a "C" language or a similar programming language. The computer-readable program instructions may be completely executed on a user computer, partly executed on a user computer, executed as a stand-alone software package, partly executed on a user computer and partly executed on a remote computer, or completely executed on a remote computer or server. When a remote computer is involved, the remote computer may be connected to a user computer through any type of network, including a LAN, a WAN, or may be connected to an external computer (for example, connected through the Internet with an Internet service provider). In some embodiments, an electronic circuit, for example, a programmable logic circuit, a field-programmable gate array (FPGA), or a programmable logic array (PLA), is customized based on status information of the computer-readable program instructions. The electronic circuit may execute the computer-readable program instructions, to implement various aspects of the present disclosure.

Various aspects of the present disclosure are described herein with reference to the flowcharts and/or block diagrams of the method, the apparatus (system), and the computer program product according to embodiments of the present disclosure. It should be understood that each block of the flowcharts and/or block diagrams and a combination of blocks in the flowcharts and/or block diagrams may be implemented based on the computer-readable program instructions.

These computer-readable program instructions may be provided for a processor of a general-purpose computer, a dedicated computer, or another programmable data processing apparatus, to produce a machine, so that the instructions, when executed by the processor of the computer or the another programmable data processing apparatus, create an apparatus for implementing functions/actions specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of the functions/actions specified in the one or more blocks in the flowcharts and/or the block diagrams.

The computer-readable program instructions may alternatively be loaded onto a computer, another programmable data processing apparatus, or another device, so that a series of operation steps are performed on the computer, the another programmable data processing apparatus, or the another device, to produce a computer-implemented process. Therefore, the instructions executed on the computer, the another programmable data processing apparatus, or the another device implements the functions/actions specified in the one or more blocks in the flowcharts and/or block diagrams.

The flowcharts and block diagrams in the accompanying drawings show system architectures, functions, and operations of possible implementations of the system, the method, and the computer program product according to embodiments of the present disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may alternatively occur in a sequence different from that marked in the accompanying drawings. For example, two continuous blocks may actually be executed substantially in parallel, and may sometimes be executed in a reverse order, depending on a function involved.

It should also be noted that each block in the block diagrams and/or flowcharts, and the combination of blocks in the block diagrams and/or flowcharts may be implemented by hardware (for example, a circuit or an ASIC that performs a corresponding function or action, or may be implemented by a combination of hardware and software, for example, firmware.

Although the present disclosure is described with reference to embodiments, in a process of implementing the present disclosure that claims protection, a person skilled in the art may understand and implement other variations of the disclosed embodiments by viewing the accompanying drawings, disclosed content, and the accompanying claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Embodiments of the present disclosure are described above. The foregoing descriptions are exemplary, not exhaustive, and are not limited to the disclosed embodiments. Many modifications and variations are apparent to a person of ordinary skill in the art without departing from the scope of the described embodiments. Selection of terms used in this specification is intended to explain embodiment principles, actual application, or improvements of technologies on the market to the best, or to enable another person of ordinary skill in the art to understand embodiments disclosed in this specification.

What is claimed is:

1. A method for obtaining traffic information, the method comprising:
   receiving vehicle-to-everything (V2X) information, wherein the V2X information indicates lane identifiers (IDs) and traffic information corresponding to the lane IDs, wherein the lane IDs comprise a first lane ID corresponding to a first lane, and wherein the traffic information comprise first traffic information corresponding to the first lane ID;
   obtaining map information indicating a second lane ID on a map corresponds to a second lane that is the same as the first lane;
   making a first determination, based on the V2X information, that a vehicle is in the second lane;
   making a second determination, based on the map information, that the vehicle is in the first lane;
   extracting, from the V2X information, traffic information corresponding to the first lane ID based on the first determination and the second determination; and
   controlling, based on the traffic information, movement of the vehicle.

2. The method of claim 1, wherein the V2X information comprises V2X MAP information, wherein the V2X MAP information comprises a lane identifier (laneID) field carrying a lane ID, and wherein the lane ID indicates the lane identifiers.

3. The method of claim 2, wherein the V2X MAP information further comprises a laneWidth field indicating widths of lanes corresponding to the lane ID.

4. The method of claim 2, wherein the V2X MAP information further comprises a laneAttributes field, and wherein the laneAttributes field indicates an attribute of a lane corresponding to the lane ID.

5. The method of claim 2, wherein the V2X MAP information further comprises a maneuvers field, and wherein the maneuvers field indicates an allowed turning behavior at a lane exit of a lane corresponding to the lane ID.

6. The method of claim 2, wherein the V2X MAP information further comprises a connectsTo field, and wherein the connectsTo field indicates a set of connection relationships between a lane corresponding to the lane ID and another lane in a downstream link.

7. The method of claim 2, wherein the V2X MAP information further comprises a points field, wherein the points field indicates a set of feature points of a lane corresponding to the lane ID, wherein the feature points comprise feature points on a lane center line, a lane edge line, or a lane stop line, and wherein the set of feature points comprises location information of each feature point.

8. The method of claim 2, wherein the V2X MAP information further comprises a speedLimits field, and wherein the speedLimits field indicates speed limit information of a lane corresponding to the lane ID or speed limit information of a link comprising the lane.

9. The method of claim 2, wherein the V2X MAP information further comprises a link Width field, and wherein the link Width field indicates a width of a link comprising a lane corresponding to the lane ID.

10. The method of claim 1, wherein the V2X information comprises a V2X signal phase and timing (SPAT) message, wherein the V2X SPAT message comprises a phase identifier (PhaseID) field carrying a phase ID, and wherein the phase ID indicates the lane identifiers.

11. The method of claim 10, wherein the V2X SPAT message further comprises a phaseStates field, and wherein the phaseStates field indicates a status of a traffic signal light corresponding to the phase ID.

12. A method comprising:

receiving vehicle-to-everything (V2X) MAP information from a road side device;

obtaining, based on the V2X MAP information, first structure information of a road;

obtaining perception data of a vehicle;

obtaining, based on the perception data, second structure information of the road;

determining, by matching the first structure information with the second structure information, that the vehicle is on a first lane; and controlling, based on the vehicle being on the first lane, movement of the vehicle.

13. The method of claim 12, wherein the V2X MAP information comprises the first structure information and identifier information that is of the first lane and that corresponds to the first structure information, and wherein determining, by matching the first structure information with the second structure information, that the vehicle is on the first lane comprises:

determining, based on a matching result, that the first structure information and the second structure information correspond to a same lane;

obtaining, based on the first structure information, the identifier information; and determining, based on the identifier information, the first lane.

14. The method of claim 12, wherein the V2X MAP information indicates a correspondence between first identifier information of a plurality of lanes and second identifier information of a plurality of phases, wherein the lanes comprise the first lane, wherein the first identifier information comprises third identifier information of the first lane, and wherein the second identifier information comprises fourth identifier information of a first phase, and wherein the method further comprises:

receiving a V2X signal phase and timing (SPAT) message from the road side device, wherein the V2X SPAT message comprises the fourth identifier information and traffic signal light status information corresponding to the fourth identifier information;

determining, from the V2X MAP information, the third identifier information;

determining, based on the correspondence and the third identifier information, the fourth identifier information; and extracting, from the V2X SPAT message, the traffic signal light status information corresponding to the fourth identifier information.

15. The method of claim 12, wherein the first structure information indicates one or more of a lane attribute, a lane location, or a lane width.

16. The method of claim 12, wherein the V2X MAP information comprises a lanes field, and wherein the lanes field indicates the first structure information.

17. A method comprising:

receiving vehicle-to-everything (V2X) MAP information from a road side device, wherein the V2X MAP information indicates location information of mark points on a road, wherein the mark points comprise a first mark point, and wherein the location information comprises first location information of the first mark point;

obtaining perception data of a vehicle;

obtaining, based on the perception data, second location information of the first mark point;

determining a deviation value between the first location information and the second location information;

obtaining localization information of the vehicle;

correcting the localization information based on the deviation value;

determining, based on the localization information, that the vehicle is in a first lane; and controlling, based on the vehicle being in the first lane, movement of the vehicle.

18. The method of claim 17, wherein the V2X MAP information indicates correspondences between first identifier information of lanes and second identifier information of phases, wherein the lanes comprise the first lane, wherein the first identifier information comprises third identifier information of the first lane, and wherein the second identifier information comprises fourth identifier information of a first phase, and wherein the method further comprises:

receiving a vehicle-to-everything signal phase and timing (SPAT) message from the road side device, wherein the V2X SPAT message comprises the fourth identifier information and traffic signal light status information corresponding to the fourth identifier information;

determining, from the V2X MAP information, the third identifier information;

determining, based on the correspondence and the third identifier information, the fourth identifier information; and extracting, from the V2X SPAT message, the traffic signal light status information corresponding to the fourth identifier information.

19. The method of claim 17, wherein a distance between the first mark point and the vehicle is within a preset range.

20. The method of claim 17, wherein a quantity of mark points comprised in the plurality of mark points depends on at least one of a length or a curvature of the road.

* * * * *